United States Patent
Hayashi et al.

(10) Patent No.: US 9,480,918 B2
(45) Date of Patent: Nov. 1, 2016

(54) COMPUTER-READABLE STORAGE MEDIUM HAVING INFORMATION PROCESSING PROGRAM STORED THEREIN AND INFORMATION PROCESSING APPARATUS

(75) Inventors: Yugo Hayashi, Kyoto (JP); Nobuhiro Sumiyoshi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 963 days.

(21) Appl. No.: 12/632,276

(22) Filed: Dec. 7, 2009

(65) Prior Publication Data

US 2011/0077899 A1 Mar. 31, 2011

(30) Foreign Application Priority Data

Sep. 28, 2009 (JP) ................................ 2009-223442

(51) Int. Cl.
*A63F 13/428* (2014.01)
*A63F 13/44* (2014.01)
*A63F 13/218* (2014.01)
*A63F 13/98* (2014.01)
*A63F 13/40* (2014.01)
*A63F 13/214* (2014.01)

(52) U.S. Cl.
CPC ............ *A63F 13/428* (2014.09); *A63F 13/02* (2013.01); *A63F 13/10* (2013.01); *A63F 13/218* (2014.09); *A63F 13/44* (2014.09); *A63F 13/214* (2014.09); *A63F 2300/1056* (2013.01); *A63F 2300/1068* (2013.01); *A63F 2300/6045* (2013.01); *A63F 2300/8064* (2013.01)

(58) Field of Classification Search
USPC .............................................. 702/173, 175
See application file for complete search history.

(56) References Cited

U.S. PATENT DOCUMENTS

| 588,172 A | 8/1897 | Peters |
|---|---|---|
| 688,076 A | 12/1901 | Ensign |
| D188,376 S | 7/1960 | Hotkins et al. |

(Continued)

FOREIGN PATENT DOCUMENTS

| DE | 40 04 554 | 8/1991 |
|---|---|---|
| DE | 195 02 918 | 8/1996 |

(Continued)

OTHER PUBLICATIONS

Nintendo Co., Ltd. and Nintendo of America's Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.

(Continued)

*Primary Examiner* — Manuel L Barbee
(74) *Attorney, Agent, or Firm* — Nixon & Vanderhye, P.C.

(57) ABSTRACT

A game apparatus calculates a load value detected by a load controller, and a center-of-gravity position of a player, at predetermined time intervals. Based on the calculated center-of-gravity position, the game apparatus firstly determines whether or not the center of gravity moves, and determines the direction of the movement. Then, the game apparatus determines a change of the load of the player within a predetermined time period. When the amount of increase of the load is equal to or higher than a threshold value, the game apparatus determines that the player swings his/her hip in the direction in which the center of gravity moves.

20 Claims, 16 Drawing Sheets

(56) References Cited

U.S. PATENT DOCUMENTS

| | | |
|---|---|---|
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nashner et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |

(56) References Cited

U.S. PATENT DOCUMENTS

| | | | |
|---|---|---|---|
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,431,593 B1 * | 8/2002 | Cooper et al. ............... 280/735 |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0058175 A1 * | 3/2006 | Hamamoto ................ 702/101 |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |

(56) References Cited

U.S. PATENT DOCUMENTS

| | | |
|---|---|---|
| 2008/0228110 A1 | 9/2008 | Berme |
| 2008/0261696 A1* | 10/2008 | Yamazaki et al. ............ 463/39 |
| 2009/0093315 A1 | 4/2009 | Matsunaga et al. |
| 2009/0260158 A1* | 10/2009 | Kazuno et al. .................. 5/600 |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| EP | 1 974 708 A1 | 10/2008 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-34016 | 2/1987 |
| JP | 62-034016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 08-182774 | 7/1996 |
| JP | 8-182774 | 7/1996 |
| JP | 08-184474 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| JP | 2008-264195 | 11/2008 |
| JP | 2009039453 A * | 2/2009 |
| JP | 2009-092408 | 4/2009 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | 2008/099582 | 8/2008 |

OTHER PUBLICATIONS

Declaration of R. Lee Rawls in Support of Nintendo Co., Ltd. and Nintendo of America Inc.'s Opposition to IA Labs CA. LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including Exhibits 1, 3-12, 193 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Divison (May 16, 2011), 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011), Appendix of Exhibits, 2 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011), Exhibit 1, 36 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011) Exhibit 2, 40 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011), Exhibit 3, 85 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA*

(56) References Cited

OTHER PUBLICATIONS

*Labs CA, LLC*, (Plaintiff) v. *Nintendo Co., Ltd. et al.*, (Defendant), United States District Court for the District of Maryland Southern Division (May 16, 2011), Exhibit 4, 10 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011), Exhibit 5, 9 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo Co., Ltd. et al.*, (Defendant), United States District Court for the District of Maryland Southern Division (May 16, 2011), Exhibit 6, 17 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 8, 45 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 9, 4 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 13, 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 14, 22 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*(Plaintiff) v. *Nintendo Co., Ltd. et al.*, (Defendant), United States District Court for the District of Maryland Southern Division (May 16, 2011), Exhibit 19, 13 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgement, *IA Labs CA, LLC*, (Plaintiff) v. *Nintendo, Co., Ltd. et al.*, (Defendant), United States District Court for the District of Maryland Southern Division (May 16, 2011), Exhibit 23, 20 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.

U.S. Trademark Application No. 74/402,755 filed Jun. 14, 1993, 43 pages.

"AccuSway Dual Top: for Balance and Postural Sway Measurement," AMTI: Force and Motion, ISO 9001:2000, 2 pages.

(56) References Cited

OTHER PUBLICATIONS

Borzelli G., Cappozzo A., and Papa E., "Inter- and intra-individual variability of ground rejection forces during sit-to-stand with principal component analysis," Medical Engineering & Physics 21 (1999), pp. 235-240.

Chiari L., Cappello A., Lenzi D., and Della Croce U, "An Improved Technique for the Extraction of Stochasitc Parameters from Stabilograms," Gait and Posture 12 (2000), pp. 225-234.

Cutlip R., Hsiao H., Garcia R., Becker E., Mayeux B., "A comparison of different postures for scaffold end-frame disassembly," Applied Ergonomics 31 (2000), pp. 507-513.

Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.

Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.

Jorgensen M.J., Marras W.S., "The effect of lumbar back support tension on trunk muscle activity," Clinical Biomechanics 15 (2000), pp. 292-294.

Deborah L. King and Vladimir M. Zatsiorsky, "Extracting gravity line displacement from stabilographic recordings," Gait & Posture 6 (1997), pp. 27-38.

Kraemer W.J., Volek J.S., Bush J.A., Gotshalk L.A., Wagner P.R., Gomez A.L., Zatsiorsky V.M., Duzrte M., Ratamess N. A., Mazzetti S.A., Selle B.J., "Influence of compression hosiery on physiological responses to standing fatigue in women," The Human Performance Laboratory, Medical & Science in Sports & Exercise, 2000, pp. 1849-1858.

Papa E. and Cappozzo A., "A telescopic inverted-pendulum model of the musculo-skeletal system and its use for the analysis of the sit-to-stand motor task," Journal of Biomechanics 32 (1999), pp. 1205-1212.

Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).

BERTEC: Dominate Your Field, Physician's Quick Guide, Version 1.0.0, Feb. 2010, 13 pages.

BERTEC: Dominate Your Field, Balancecheck Screener, Version 1.0.0, Feb. 2010, 35 pages.

BERTEC: Dominate Your Field, Balancecheck Trainer, Version 1.0.0, Feb. 2010, 37 pages.

BERTEC Corporation—Balancecheck Standard Screener Package, http://bertec.com/products/balance-systems/standard-screener.html, 1 page. (Retrieved Apr. 12, 2011).

BERTEC Corporation—Balance Systems: Balancecheck Advanced balance assessment & training products for the balance professional, http://bertec.com/products/balance-systems.html, 1 page. (Retrieved Mar. 31, 2011).

BERTEC Corporation—Balancecheck Mobile Screener Package: Portable balance screening with full functionality, http://bertec.com/products/balance-systems/mobile-screener.html, 1 page. (Retrieved Mar. 31, 2011).

BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).

U.S. Trademark Application No. 75/136,330 filed Jul. 19, 1996, 47 pp.

BERTEC: Dominate Your Field, Digital Acquire 4, Version 4.0.10, Mar. 2011, 22 pages.

BERTEC: Dominate Your Field, Bertec Force Plates, Version 1.0.0, Sep. 2009, 31 pages.

BERTEC: Dominate Your Field, Product Information: Force Plate FP4060-08:Product Details and Specifications, 4 pages.

BERTEC: Dominate Your Field, Product Information: Force Plate FP4060-10:Product Details and Specifications, 2 pages.

U.S. Trademark Application No. 73/542,230 filed Jun. 10, 1985, 52 pages.

Brent L. Arnold and Randy J. Schmitz, "Examination of Balance Measures Produced by the Biodex Stability System," Journal of Athletic Training, vol. 33(4), 1998, pp. 323-327.

Trademark Registration No. 1,974,115 filed Mar. 28, 1994, 8 pages.

ICS Balance Platform, Fall Prevention: Hearing Assessment, Fitting Systems, Balance Assessment, Otometrics: Madsen, Aurical, ICS, 2 pages.

U.S. Trademark Application No. 75/471,542 filed Apr. 16, 1998, 102 pages.

VTI Force Platform, Zapconnect.com: Medical Device Industry Portal, http://zapconnect.com/products/index.cfm/fuseaction/products, 2 pages. (Retrieved Apr. 5, 2011).

Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.

Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.

Dr. Guido Pagnacco, Publications, 1997-2008, 3 pages.

College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).

EyeTracker, IDEAS, DIFRA, 501(k) Summary: premarket notification, Jul. 5, 2007, 7 pages.

Vestibular technologies, copyright 2000-2004, 1 page.

Scopus preview—Scopus—Author details (Pagnacco, Guido), http:www.scopus.com/authid/detail.url?authorId=6603709393, 2 pages. (Retrieved Apr. 20, 2011).

Vestibular Technologies Company Page, "Vestibular technologies: Helping People Regain their Balance for Life," http:www.vestibtech.com/AboutUs.html, 2 pages. (Retrieved Apr. 20, 2011).

GN Otometrics Launces ICS Balance Platform: Portable system for measuring postural sway, http://audiologyonline.com/news/pf_news_detail.asp?news_id=3196, 1 page. (Retrieved Mar. 31, 2011).

U.S. Trademark Application No. 75/508,272 filed Jun. 25, 1998, 36 pages.

U.S. Trademark Application No. 75/756,991 filed Jul. 21, 1999, 9 pages.

U.S. Trademark Application No. 76/148,037 filed Oct. 17, 2000, 78 pages.

Vestibular technologies, VTI Products: BalanceTrak User's Guide, Preliminary Version 0.1, 2005, 34 pages.

U.S. Trademark Application No. 76/148,037 filed Oct. 17, 2000, 57 pages.

Vestibular Technologies, Waybackmachine, http://vestibtech.com/balancetrak500.html, 7 pages. (Retrieved Mar. 30, 2011).

Vestibular Technologies, 2004 Catalog, 32 pages.

The Balance Trak 500—Normative Data, 8 pages.

State of Delaware: The Official Website of the First State, Division of Corporations—Online Services, http://delecorp.delaware.gov/tin/controller, 2 pages. (Retrieved Mar. 21, 2011).

Memorandum in Support of Plaintiff IA Labs' Motion for Partial Summary Judgment on Defendants' Affirmative Defense and Counterclaim That U.S. Pat. No. 7,121,982 is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.

Addlesee, M.D., et al., "The ORL Active Floor," IEEE—Personal Communications, Oct. 1997.

Baek, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

(56) References Cited

OTHER PUBLICATIONS

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.
Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.
Harikae, Miho, "Visualization of Common People's Behavior in the Barrier Free Environment," Graduate Thesis—Master of Computer Science and Engineering in the Graduate School of the University of Aizu, Mar. 1999.
Hodgins, J.K., "Three-Dimensional Human Running," Proceedings: 1996 IEEE International Conference on Robotics and Automation, vol. 4, Apr. 1996.
Kim, Jong Yun, et al., "Abstract—A New VR Bike System for Balance Rehabilitation Training," Proceedings: 2001 IEEE Seventh International Conference on Virtual Systems and Multimedia, Oct. 2001.
McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.
NeuroCom International, Inc.—Balance Manager Systems/Products—http://resourcesonbalance.com/neurocom/products/index.aspx.
NeuroCom International, Inc.—Neurogames—http://resourcesonbalance.com/neurocom/products/NeuroGames.aspx.
Nicholas, Deborah S, "Balance Retraining After Stroke Using Force Platform Feedback," Physical Therapy, vol. 77, No. 5, pp. 553-558, May 1997.
Nintendo Co., Ltd.—Aerobic Exercise Rhythm Boxing—http://www.nintendo.co.jp/wii/rfnj/training/aerobics/aerobics07.html.
Redfern, Mark, et al., "Visual Influences of Balance," Journal of Anxiety Disorders, vol. 15, pp. 81-94, 2001.
Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.
Tossavainen, Timo, et al., "Postural Control as Assessed with Virtual Reality," Acta Otolaryngol, Suppl 545, pp. 53-56, 2001.
Tossavainen, Timo, et al., "Towards Virtual Reality Simulation in Force Platform Posturography," MEDINFO, pp. 854-857, 2001.
Tsutsuguchi, Ken, et al., "Human Walking Animation Based on Foot Reaction Force in the Three-Dimensional Virtual World," The Journal of Visualization and Computer Animation, vol. 11, pp. 3-16, 2000.
Wong, Alice, et al., "The Devlopment and Clinical Evaluation of a Standing Biofeedback Trainer," Journal of Rehabilitation Research and Development, vol. 34, No. 3, pp. 322-327, Jul. 1997.
Yang, Ungyeon, et al., "Implementation and Evaluation of 'Just Follow Me': An Immersive, VR-Based, Motion-Training System," Presence, vol. 11, No. 3, pp. 304-323, 2002.
Search Report (2 pgs.) dated May 27, 2011 issued in German Application No. 20 2004 021 793.7.
Office Action for corresponding EP Patent Application No. 09 178 366.2 dated Feb. 18, 2016.
Interface, Inc.—Advanced Force Measurement—SM Calibration Certificate Installation Information, 1984.
Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.
Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.
Ian Bogost, "The Rhetoric of Exergaming," The Georgia Institute of Technology, 9 pages (date unknown).
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Innovation in Action—Biofeed back Motor Control, Active Leg Press—IsoLegPress, 2 pages (date unknown).
Ric Manning, "Videogame players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
AGH Musuem—Suncom Aerobics Joystick; http://atarihq.com/museum/2678/hardware/aerobics.html, (retrieved date unknown) 1 page.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System. It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/Audio Cable; Product #5015, MSRP 9.99; http://www.madcatz.com/Default.asp?Page=133
&CategoryImg=Universal_Cables, retrieved May 12, 2005, 1 page.
Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.
Linda S. Miller, "Upper Limb Exerciser," Biometrics Ltd—Unique Solutions for Clinical and Research Applications, 6 pages (date unknown).
Raymond W, McGorry, "A system for the measurement of grip forces and applied moments during hand tool use," Liberty Mutual Research Center for Safety and Health, Applied Ergonomics 32 (2001) 271-279.
NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.

(56) References Cited

OTHER PUBLICATIONS

Leigh Ann Roman, "Boing! Combines Arcade Fun with Physical Training," Memphis—Health Care News: Monitoring the Pulse of Our Health Care Community, Sep. 20, 1996, One Section, 1 page.
"No More Couch Potato Kids," as shown in Orange Coast, Sep. 1994, p. 16.
Gary L. Downey, et al., "Design of an Exercise Arcade for Children with Disabilities," Resna, Jun. 26-30, 1998, pp. 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
"Look Ma! No Hands!", The Joyboard—Power Body Control, (date unknown).
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—the free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance_Dance_Revolution (retrieved Jul. 23, 2010), 9 pages.
"Cure for the couch potato," Kansas City Star (MO), Jan. 2, 2005, WLNR 22811884, 1 page.
JC Fletcher, "Virtually Overlooked; The Power Pad games," Joystiq, http://www.joystiq.com/2007/09/20/virtually-overlooked-the-power-pad-games/ (retrieved Jul. 26, 2010), 3 pages.
Family Fun Fitness, Nintendo Entertainment System, BANDAI, (date unknown).
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http://bpl.blogger.com/_J5LEiGp54I/RpZbNpnLDgl/AAAAAAAAAic/Gum6DD3Umjg/s1600-h/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id=10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
Vs. Slalom—Step Up to the Challenge, Nintendo, (date unknown).
Vs. Slalom—Live the Thrill, Nintendo, (date unknown).
Vs. Slalom—Operation Manual, MDS(MGS), Nintendo, 4 pages, (date unknown).
HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; For Installation in: VS. UniSystem (Upright) and Vs. DualSystem (Upright), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Jerry Smith, "Other Input Devices," Human Interface Technology Laboratory, 2 pages, (date unknown).
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
"Hard Drivin'," KLOV—Killer List of Video Games, The International Arcade Museum, http://www.arcade-museum.com, 6 pages, (date unknown).
"The World's First Authentic Driving Simulation Game!", Hard Drivin'—Get Behind the Wheel and Feel the Thrill (image), Atari games Corporation, 1 page, (date unknown).
Electronic Entertainment Expo (E3) Overview, Giant Bomb—E3 2004 (video game concept), http://www.giantbomb.com/e3-2004/92-3436/ (retrieved Sep. 3, 2010), 3 pages.
Guang Yang Amusement, Product Name: Live Boxer, 1 page, (date unknown).
Family Fun Fitness: Basic Set (Control Mat and Athletic World Game Pak), Nintendo Entertainment System, Bandai, (date unknown).
Roll & Rocker (image), 1 page, (date unknown).
Roll & Rocker, Enteractive (image), 2 pages, (date unknown).
Michael Goldstein, "Revolution on Wheels—Thatcher Ulrich," Nov.-Dec. 1994, 3 pages.
"Playboy On the Scene: Ride On!", 1 page, (date unknown).
Candace Putnam, "Software for Hardbodies: A virtual-reality hike machine takes you out on the open road," Design, 1 page, (date unknown).
Rachel, "No-Sweat Exercise—Can you get healthier without really trying?" Fitness, 1 page, (date unknown).
Fitness article, Sep. 1994, p. 402-404.
"Wired Top 10: Best Selling Toys in Jun. 1994," Wired Sep. 1994, 1 page.
"Top Skater," Sega Amusements U.S.A, Inc, 1 page, (date unknown).
Katharine Alter, et al., "Video Games for Lower Extremity Strength Training in Pediatric Brain Injury Rehabilitation," National Rehabilitation Hospital, 18 pages, (date unknown).
Cateye Recumbent GameBike Pro: Latest Technology in Exercise Bikes, beyondmoseying.com High Performance Exercise Equipment, 2 pages (advertisement; no date).
Fitness Fun, while Exercising and Getting FIT for Kids, Teens and Adults, (advertisement, no date).
Warranty Information and Your Joyboard: How it Works, Amiga Corporation, date unknown, 2 pages.
Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC v. Nintendo Co., Ltd. and Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC v. Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC v. Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC v. Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages (redacted).

\* cited by examiner

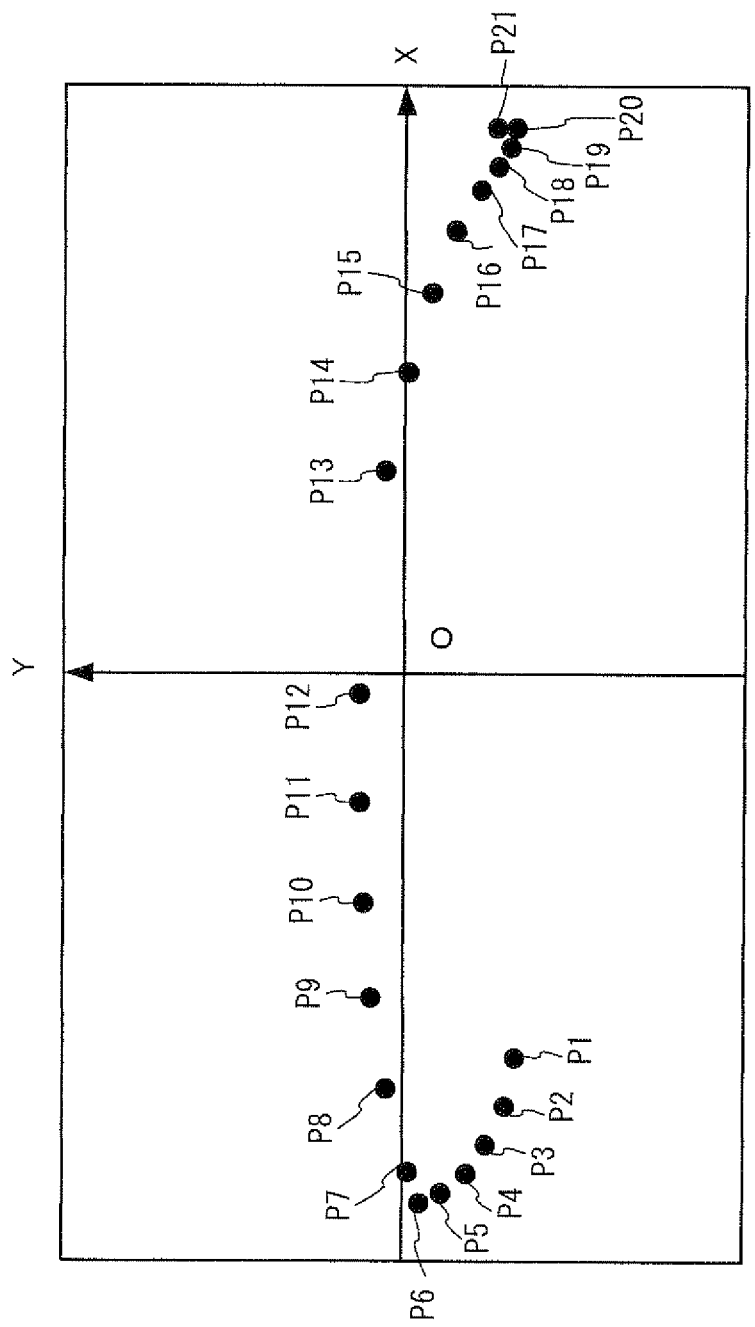

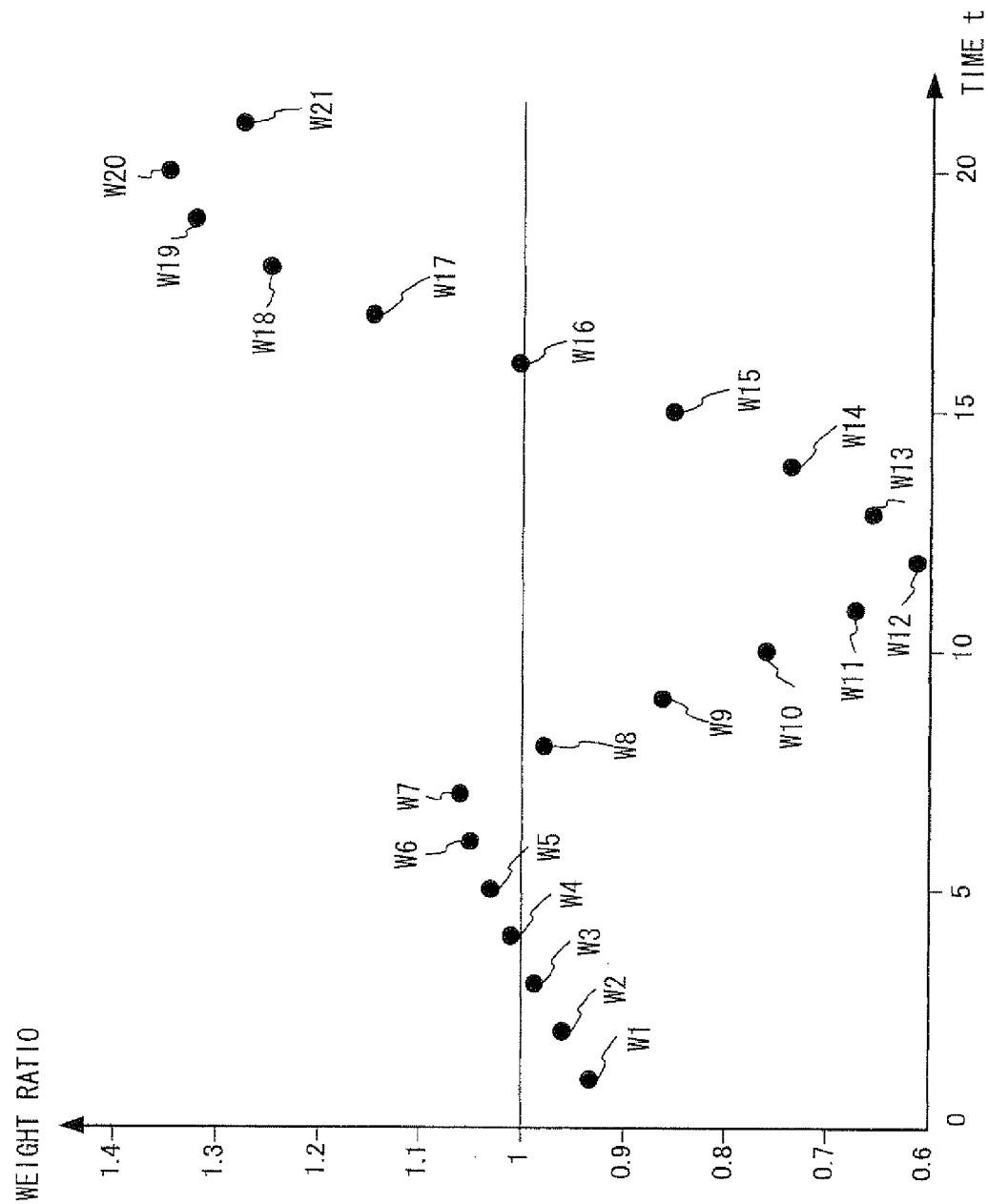

COMPUTER-READABLE STORAGE MEDIUM HAVING INFORMATION PROCESSING PROGRAM STORED THEREIN AND INFORMATION PROCESSING APPARATUS

CROSS REFERENCE TO RELATED APPLICATION

The disclosure of Japanese Patent Application No. 2009-223442, filed on Sep. 28, 2009, is incorporated herein by reference.

BACKGROUND OF THE INVENTION

1. Field of the Invention

The present invention relates to a computer-readable storage medium having an information processing program stored therein, and to an information processing apparatus. Specifically, the present invention relates to a computer-readable storage medium having stored therein an information processing program which performs a predetermined process based on a load and a center-of-gravity position of a user, and to an information processing apparatus which performs a predetermined process based on a load and a center-of-gravity position of a user.

2. Description of the Background Art

Conventionally, there is an information processing apparatus which moves a character displayed on a screen, based on a center-of-gravity position of a user (for example, Japanese Laid-Open Patent Publication No. 2005-334083 (Patent Document 1)). Specifically, in the apparatus disclosed in Patent Document 1, a predetermined neutral circle is set, and, when a center-of-gravity position is shifted out of the neutral circle, a character moves. When the center-of-gravity position is not outside the neutral circle, the character does not move.

However, the technique disclosed in the above-mentioned Patent Document 1 involves the following problem. That is, when a user moves the center-of-gravity position, the center-of-gravity position is sometimes transiently moved in a direction different from a direction intended by the user. Specifically, when the user moves the center-of-gravity position, the center-of-gravity position may be transiently moved in the opposite direction to the direction intended by the user, and then the center-of-gravity position is moved in the direction intended by the user. The apparatus disclosed in the above-mentioned Patent Document 1 has a problem that, in such a case, the character is moved based on a detection of the movement of the center-of-gravity position in the opposite direction to the direction intended by the user, so that the character cannot be moved as the user has intended.

SUMMARY OF THE INVENTION

Therefore, an object of the present invention is to provide an information processing program and an information processing apparatus which are capable of accurately determining an intentional action of a user.

The present invention has the following features to solve the problem mentioned above.

An embodiment of the present invention is directed to a computer-readable storage medium having stored therein an information processing program executable by a computer of an information processing apparatus for processing a signal supplied from an input device which includes a load sensor for detecting a load of a user. The information processing program causes the computer to function as load information acquisition means, center-of-gravity information acquisition means, load determination means, and action determination means. The load information acquisition means acquires load information concerning the load of the user or a change of the load over time, based on the signal supplied from the input device. The center-of-gravity information acquisition means acquires center-of-gravity information concerning a center-of-gravity position of the user or a direction in which the center-of-gravity position moves, based on the signal supplied from the input device. The load determination means determines whether or not the load information satisfies a first condition. The action determination means determines a predetermined action of the user, based on the center-of-gravity information obtained when a result of the determination performed by the load determination means is affirmative.

Here, the load information may be a load value at a predetermined point of time, or may be a rate of increase or decrease of the load value, the maximum value (or a local maximum value) or the minimum value (or a local minimum value) of the load value, a pattern of a change of the load, or the like. In addition, the center-of-gravity information may be information concerning the center-of-gravity position of the user, or may be information concerning the direction in which the center-of-gravity position moves.

According to the above features, whether or not the load information satisfies the predetermined condition can be determined by the load determination means. Then, based on the center-of-gravity position or the direction in which the center-of-gravity position moves which are obtained when a result of the determination is affirmative, the predetermined action of the user can be determined. This enables an accurate determination of the action performed by the user.

In an embodiment of the present invention, the load determination means may determine whether or not the load of the user increases, based on the load information.

According to the above feature, whether or not the load of the user increases can be determined. Therefore, the predetermined action of the user can be determined based on the center-of-gravity position or the direction in which the center-of-gravity position moves which are obtained when the load of the user increases. Moreover, in a case where the load changes along with the predetermined action of the user, the predetermined action of the user can be quickly determined at a time when the load turns to show an increasing tendency.

In an embodiment of the present invention, the load determination means may determine whether or not a rate of increase of the load is equal to or higher than a predetermined threshold value.

According to the above feature, the predetermined action of the user can be determined based on the center-of-gravity position or the direction in which the center-of-gravity position moves which are obtained when the rate of increase of the load is equal to or higher than the predetermined threshold value. As a result, the action intended by the user can be accurately determined.

In an embodiment of the present invention, the center-of-gravity information acquisition means may acquire the center-of-gravity information concerning the direction in which the center-of-gravity position moves, based on the signal supplied from the input device. In addition, the action determination means may determine the predetermined action of the user, based on the center-of-gravity information concerning the direction in which the center-of-gravity position moves, which is acquired by the center-of-gravity information acquisition means and obtained when the result of the determination performed by the load determination means is affirmative.

According to the above feature, the predetermined action of the user can be determined based on the direction in which the center-of-gravity position moves, which is obtained when the result of the determination performed by the load determination means is affirmative. For example, it can be determined that the user performs the predetermined action in the direction in which the center-of-gravity position moves.

In an embodiment of the present invention, the center-of-gravity information acquisition means may acquire the center-of-gravity information concerning the center-of-gravity position, based on the signal supplied from the input device. In addition, when the absolute value of a coordinate value, with respect to a direction of a predetermined axis, of the center-of-gravity position which is obtained when the result of the determination performed by the load determination means is negative, is equal to or greater than a predetermined threshold value, the action determination means may determine that the user performs the predetermined action.

According to the above feature, even when the result of the determination performed by the load determination means is negative, the action of the user can be determined based on the center-of-gravity position obtained at that time. That is, even when the result of the determination performed by the load determination means is negative, if the absolute value of the coordinate value of the center-of-gravity position is equal to or greater than the predetermined threshold value, it is determined that the user performs the predetermined action, and therefore the action intended by the user can be determined with an increased accuracy.

In an embodiment of the present invention, the center-of-gravity information acquisition means may acquire the center-of-gravity information concerning the center-of-gravity position and the direction in which the center-of-gravity position moves, based on the signal supplied from the input device. In addition, the information processing program may cause the computer to function further as first threshold value determination means. The first threshold value determination means determines whether or not the absolute value of a coordinate value of the center-of-gravity position with respect to a direction of a first axis is equal to or greater than a first threshold value. The action determination means determines the predetermined action of the user, based on the direction in which the center-of-gravity position moves, which is obtained when the result of the determination performed by the load determination means is affirmative and a result of the determination performed by the first threshold value determination means is affirmative.

According to the above feature, when the result of the determination performed by the load determination means is affirmative and the absolute value of the coordinate value of the center-of-gravity position obtained at that time is equal to or greater than the first threshold value, the predetermined action of the user can be determined based on the direction in which the center-of-gravity position moves which is obtained at that time.

In an embodiment of the present invention, the information processing program may cause the computer to function further as second threshold value determination means. The second threshold value determination means determines whether or not the absolute value of the coordinate value of the center-of-gravity position with respect to the direction of the first axis is equal to or greater than a second threshold value which is greater than the first threshold value. The action determination means determines the predetermined action of the user, based on the center-of-gravity position obtained when the result of the determination performed by the load determination means is negative and a result of the determination performed by the second threshold value determination means is affirmative.

According to the above feature, when the result of the determination performed by the load determination means is negative and the absolute value of the coordinate value of the center-of-gravity position obtained at that time is equal to or greater than the second threshold value, the predetermined action of the user can be determined based on the center-of-gravity position obtained at that time.

In an embodiment of the present invention, the center-of-gravity information acquisition means may acquire the center-of-gravity information concerning the center-of-gravity position, based on the signal supplied from the input device. In addition, the information processing program may cause the computer to function further as region determination means. The region determination means determines whether or not the center-of-gravity position exists in a predetermined region which is set at a predetermined position on an input plane which is provided in the input device and to which the load is applied by the user. When the result of the determination performed by the load determination means is affirmative and a result of the determination, at that time, performed by the region determination means is negative, the action determination means determines that the user performs the predetermined action.

According to the above feature, when the result of the determination performed by the load determination means is affirmative and the center-of-gravity position does not exist in the predetermined region set on the input plane, it can be determined that the user performs the predetermined action. That is, even when the result of the determination performed by the load determination means is affirmative, if the center-of-gravity position obtained at that time exists in the predetermined region, it is not determined that the user performs the predetermined action. This enables the action intended by the user to be determined with an increased accuracy. For example, when the predetermined region is set near the center of the input plane, then if the center-of-gravity position exists near the center of the input plane, it is not determined that the user performs the predetermined action, and thus the action intended by the user can be determined.

In an embodiment of the present invention, the center-of-gravity information acquisition means may acquire the center-of-gravity information concerning the center-of-gravity position and the direction in which the center-of-gravity position moves, based on the signal supplied from the input device. In addition, the information processing program may cause the computer to function further as threshold value determination means. The threshold value determination means determines whether or not the absolute value of a coordinate value of the center-of-gravity position with respect to a direction of a first axis is equal to or greater than a predetermined threshold value. When a result of the determination performed by the threshold value determination means is affirmative, the action determination means determines the predetermined action of the user based on the center-of-gravity position, which is obtained when the result is affirmative. On the other hand, the action determination means determines the predetermined action of the user based on the direction in which the center-of-gravity position moves, which is obtained when the result of the determination performed by the threshold value determination means is negative and the result of the determination performed by the load determination means is affirmative.

According to the above feature, when the absolute value of the coordinate value of the center-of-gravity position is equal to or greater than the predetermined threshold value, the action of the user can be determined based on the center-of-gravity position. On the other hand, when the absolute value of the coordinate value of the center-of-gravity position is less than the predetermined threshold value, whether or not the result of the determination performed by the load determination means is affirmative is determined, and the action of the user can be determined based on the direction in which the center-of-gravity position moves which is obtained when the result of the determination is affirmative.

In an embodiment of the present invention, the information processing program may cause the computer to function further as movement speed calculation means and movement speed determination means. The movement speed calculation means calculates a speed at which the center-of-gravity position of the user moves, based on the center-of-gravity information acquired by the center-of-gravity information acquisition means. The movement speed determination means determines whether or not the speed at which the center-of-gravity position moves, which is calculated by the movement speed calculation means, satisfies a second condition. When the result of the determination performed by the load determination means is affirmative and a result of the determination, at that time, performed by the movement speed determination means is affirmative, the action determination means determines the predetermined action of the user, based on the center-of-gravity information.

According to the above feature, the action of the user can be determined in consideration of the speed at which the center-of-gravity position moves, too. For example, when the result of the determination performed by the load determination means is affirmative and the speed at which the center-of-gravity position moves is equal to or higher than the predetermined threshold value, the predetermined action of the user can be determined based on the center-of-gravity information.

In an embodiment of the present invention, a plurality of first regions and a plurality of second regions provided at boundaries of the first regions may be in advance set on an input plane which is provided in the input device and to which the load is applied by the user. In this case, when the center-of-gravity position, which is acquired by the center-of-gravity information acquisition means and obtained when the result of the determination performed by the load determination means is negative, exists in the first region, the action determination means determines that the user performs the predetermined action.

According to the above feature, even when the result of the determination performed by the load determination means is negative, the action of the user can be determined based on the center-of-gravity position. That is, it can be determined that the user performs the predetermined action, only when the center-of-gravity position of the user, which is obtained when the result of the determination performed by the load determination means is negative, exists in the first region set on the input plane.

In an embodiment of the present invention, the action determination means may determine whether or not the user performs the predetermined action in a predetermined direction.

According to the above feature, the action of the user involving a direction can be determined.

In an embodiment of the present invention, the action determination means may repeatedly determine whether or not the user performs the predetermined action in a predetermined direction. The information processing program causes the computer to function further as determination result storage means. When the action determination means determines that the user performs the predetermined action in the predetermined direction, the determination result storage means stores therein a determination result indicating the direction in which the user performs the predetermined action. The action determination means determines that the user performs the predetermined action, only when the direction in which the user performs the predetermined action, which is obtained based on the center-of-gravity information, is different from the direction indicated by an immediately preceding determination result stored in the determination result storage means.

According to the above feature, whether or not the user performs the predetermined action in the predetermined direction can be repeatedly determined, and the direction in which the user has performed the immediately preceding predetermined action can be stored. In determining the current action of the user, it can be determined that the user performs the predetermined action, only when the direction in which the user performs the predetermined action, which is obtained based on the center-of-gravity information, is different from the direction in which the user has performed the immediately preceding action. This can prevent such a determination that the user performs the predetermined action successively in the same direction. Thus, an erroneous determination can be prevented.

In an embodiment of the present invention, a plurality of regions each indicating a direction in which the user performs the action may be in advance set on an input plane which is provided in the input device and to which the load is applied by the user. The action determination means determines that the user performs the predetermined action in the direction indicated by the region, on the input plane, where the center-of-gravity position exists.

According to the above feature, the plurality of regions are in advance set on the input plane of the input device. Then, it can be determined that the user performs the predetermined action in the direction indicated by the region, on the input plane, where the center-of-gravity position exists.

In an embodiment of the present invention, the action determination means may determine that the user performs the predetermined action in the direction indicated by the region, on the input plane, where the center-of-gravity position exists, the center-of-gravity position being obtained when the result of the determination performed by the load determination means is negative.

According to the above feature, even when the result of the determination performed by the load determination means is negative, it can be determined that the user performs the predetermined action in the direction indicated by the region, on the input plane, where the center-of-gravity position obtained at that time exists.

In an embodiment of the present invention, the information processing program may cause the computer to function further as display control means. The display control means displays, on a display device, an appearance in which the user performs the predetermined action, when a result of the determination performed by the action determination means is affirmative.

According to the above feature, the action performed by the user can be displayed on the display device.

In addition, an embodiment of the present invention may be directed to an information processing apparatus for executing the information processing program described above.

According to an embodiment of the present invention, the action intentionally performed by the user can be accurately determined.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9A is a diagram showing a change of a center-of-gravity position at a time when the player swings his/her hip to the right;

FIG. 9B is a diagram showing a change of a load value detected by the load controller 36 at the time when the player swings his/her hip to the right;

DESCRIPTION OF THE PREFERRED EMBODIMENTS

Overall Configuration of Game System

Figure 1:
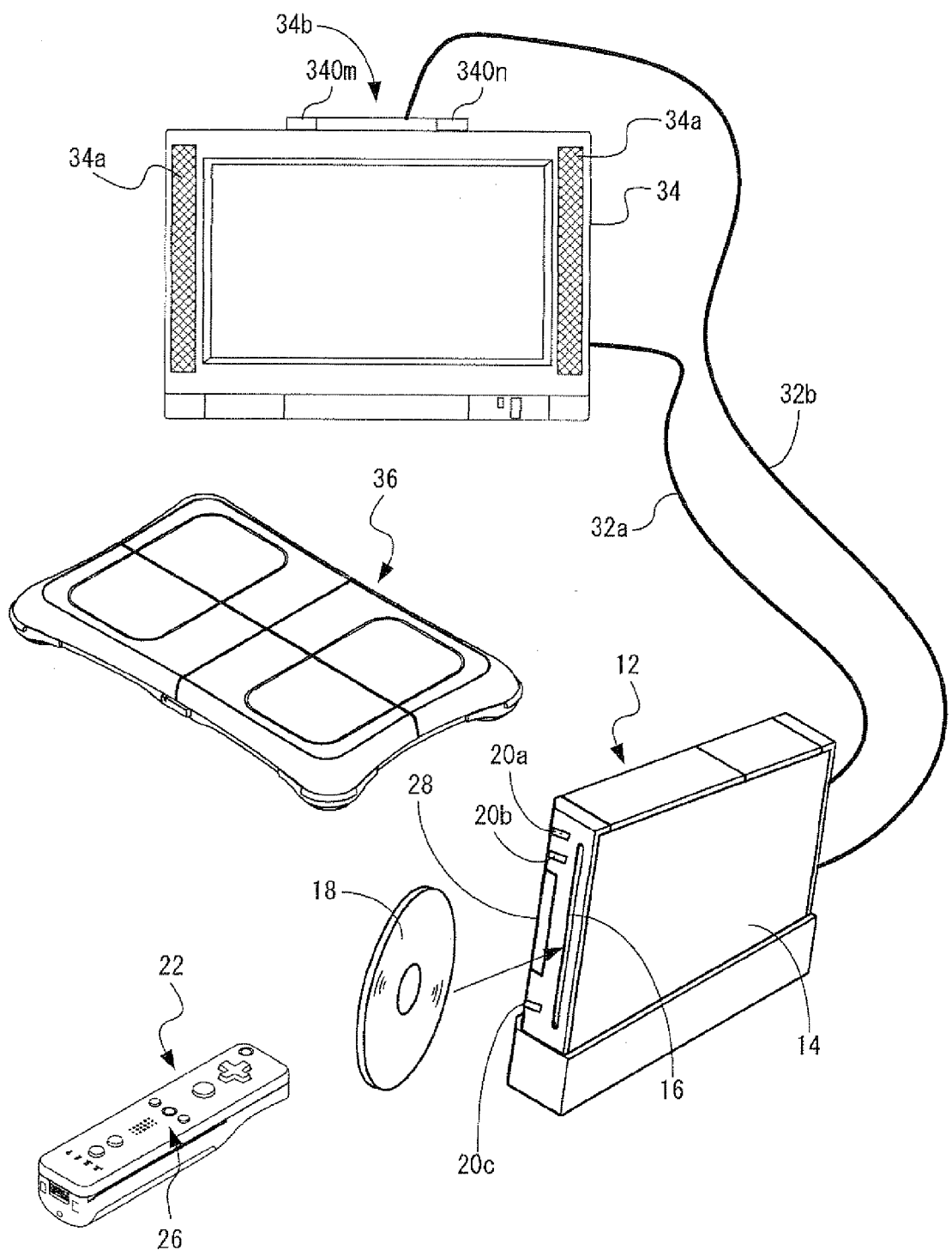
FIG. 1 is an external view of a game system according to an embodiment of the present invention.

Next, an embodiment of the present invention will be described with reference to the accompanying drawings. FIG. 1 is an external view of a game system according to the embodiment of the present invention. The game system 10 includes a game apparatus 12, a controller 22, and a load controller 36. Note that, the game apparatus 12 of the present embodiment is designed to communicate with up to four controllers (22, 36), though not shown. Also, the game apparatus 12 and each controller (22, 36) are connected to each other via wireless communication. For example, the wireless communication is executed in accordance with the Bluetooth (registered trademark) standard, or alternatively, may be executed in accordance with other standards, such as infrared, wireless LAN or the like.

The game apparatus 12 includes a housing 14 in the shape of substantially a rectangular parallelepiped. A disc slot 16 is provided in a front surface of the housing 14. An optical disc 18 which is an exemplary information storage medium having stored therein a game program or the like is inserted and loaded through the disc slot 16 into a disc drive 54 (see FIG. 2) in the housing 14. An LED and a light guide plate are provided around the disc slot 16 and can be turned ON in response to various processes.

Also, a power button 20a and a reset button 20b are provided in an upper portion of the front surface of the game apparatus 12, and an eject button 20c is provided in a lower portion thereof. Moreover, a connector cover 28 for an external memory card is provided between the reset button 20b and the eject button 20c and in the vicinity of the disc slot 16. A connector 62 for an external memory card (see FIG. 2) is provided inside the external memory card connector cover 28. An external memory card (hereinafter simply referred to as a "memory card" (not shown)) is inserted into the connector 62. The memory card is utilized to load and temporarily store a game program or the like read out from the optical disc 18, or to store (save) game data (result data or intermediate data of a game) of a game played using the game system 10. Note that the game data may be stored into, for example, an internal memory, such as a flash memory 44 (see FIG. 2), which is provided in the game apparatus 12, instead of the memory card. Also, the memory card may be used as a backup memory for the internal memory.

Note that, as the memory card, a general-purpose SD card can be used, or alternatively, other general-purpose memory cards, such as a memory stick (registered trademark) and a multimedia card (registered trademark), can be used.

An AV cable connector 58 (see FIG. 2) is provided in a rear surface of the housing 14 of the game apparatus 12. The AV cable connector 58 is used to connect a monitor 34 and loudspeakers 34a to the game apparatus 12 via an AV cable 32a. The monitor 34 and the loudspeakers 34a may be typically of a color television set. The AV cable 32a allows a video signal and an audio signal from the game apparatus 12 to be input to a video input terminal and an audio input terminal of the color television, respectively. Therefore, a game image of a three-dimensional (3D) video game is displayed on a screen of the color television (monitor) 34, and stereo game audio, such as game music or sound effects, is output from the right and left loudspeakers 34a. Also, a marker unit 34b including two infrared LEDs (markers) 340m and 340n is provided in the vicinity of the monitor 34 (in the present embodiment, an upper portion of the monitor 34). The marker unit 34b is connected via a power supply cable 32b to the game apparatus 12. Therefore, power is supplied from the game apparatus 12 to the marker unit 34b. As a result, the markers 340m and 340n perform light emission and output infrared light toward the front of the monitor 34.

Note that power for the game apparatus 12 is supplied from a typical AC adapter (not shown). The AC adapter is plugged into a standard home wall socket. The game apparatus 12 converts home power supply (commercial power supply) into a low DC voltage signal suitable for driving. In other embodiments, a battery may be used as a power supply.

In the game system 10, when a user or users desire to play a game (or other applications rather than games), the user initially powers ON the game apparatus 12, and then selects an appropriate optical disc 18 having stored therein a program of a video game (or another application which the user desires to play), and loads the optical disc 18 into the disc drive 54 of the game apparatus 12. In response to this, the game apparatus 12 starts executing the video game or another application based on a program recorded on the optical disc 18.

The user operates the controller 22 so as to give an input to the game apparatus 12. For example, by operating any of a plurality of input means 26, the game or another application is started. Also, in addition to operations to the input means 26, by moving the controller 22 itself, a moving image object (user object) can be moved in different directions, or a point of view (camera position) of the user in a 3D game world can be changed. An acceleration sensor (not shown) for detecting acceleration in three axis directions is provided in the controller 22, and acceleration caused by the user moving the controller 22 can be detected. The game apparatus 12 can perform a predetermined game process in accordance with acceleration obtained from the controller 22. Moreover, an imaging means for imaging infrared light emitted from the markers 340m and 340n is provided in the controller 22, and thereby the controller 22 functions also as a pointing input device for pointing a position on the screen of the monitor 34.

Figure 2:
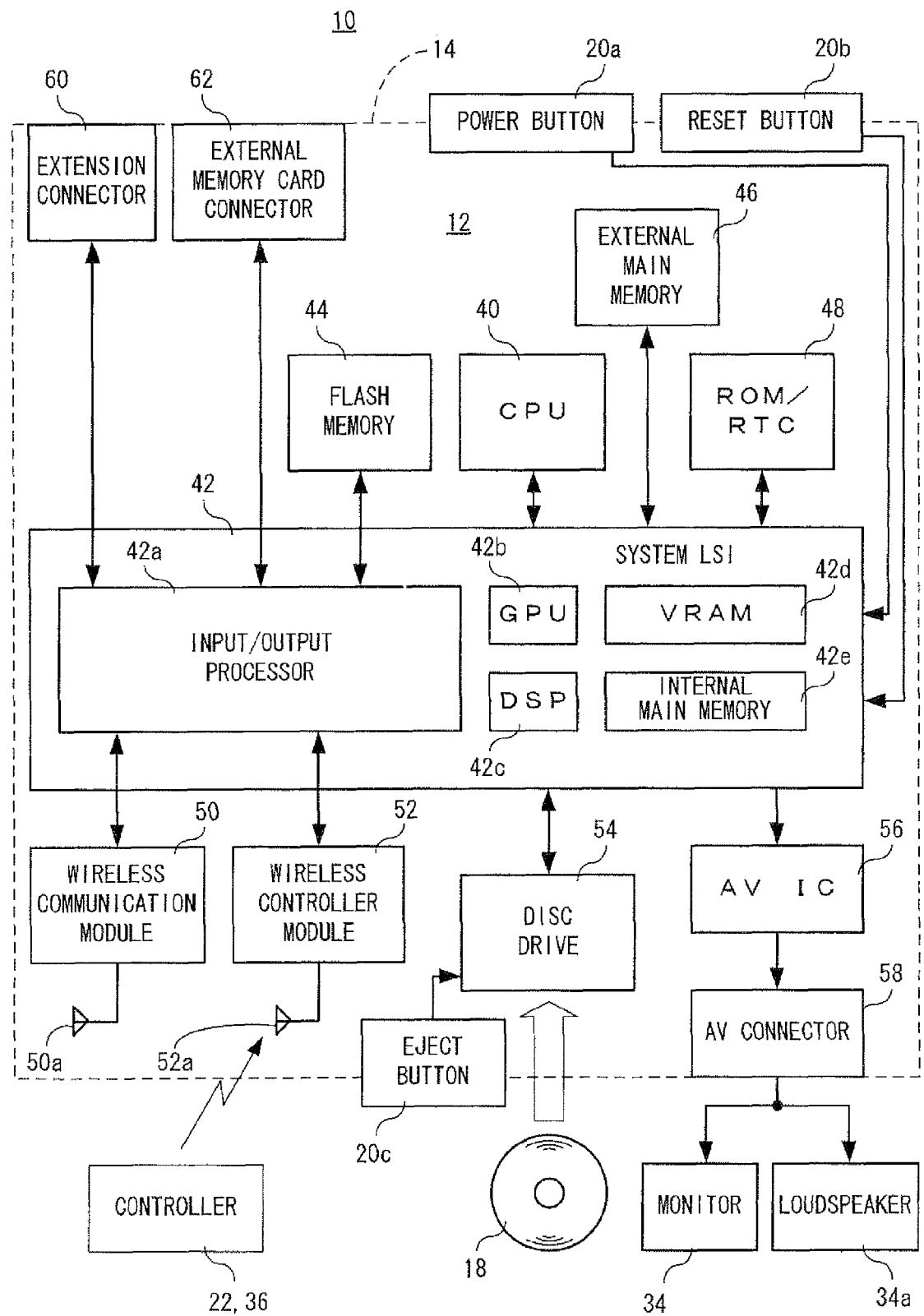
FIG. 2 is a block diagram showing an electrical configuration of a video game system 10 of the present embodiment.

FIG. 2 is a block diagram showing an electrical configuration of the video game system 10 of the present embodiment. Components in the housing 14 are mounted to a printed board, though not shown. As shown in FIG. 2, the game apparatus 12 includes a CPU 40. The CPU 40 functions as a game processor. A system LSI 42 is connected to the CPU 40. An external main memory 46, a ROM/RTC 48, a disc drive 54 and an AV IC 56 are connected to the system LSI 42.

The external main memory 46 stores a program, such as a game program or the like, or various kinds of data, or serves as a work area or a buffer area for the CPU 40. The ROM/RTC 48 is a so-called boot ROM, in which a program for booting the game apparatus 12 is incorporated and a clock circuit for counting time is provided. The disc drive 54 reads out program data, texture data or the like from the optical disc 18, and writes data into an internal main memory 42e (described below) or the external main memory 46 under the control of the CPU 40.

The system LSI 42 includes an input-output processor 42a, a GPU (Graphics Processor Unit) 42b, a DSP (Digital Signal Processor) 42c, a VRAM 42d, and the internal main memory 42e, which are connected to each other via an internal bus (not shown).

The input/output processor (I/O processor) 42a executes transmission/reception or downloading of data. The data transmission/reception or downloading will be described in detail below.

The GPU 42b, which is a part of a drawing means, receives a graphics command (drawing command) from the CPU 40, and generates game image data in accordance with the command. Note that the CPU 40 gives the GPU 42b an image generating program required for generation of the game image data in addition to the graphics command.

The VRAM 42d is connected to the GPU 42b as described above, though not shown. The GPU 42b accesses the VRAM 42d to acquire data (image data: polygon data, texture data, etc.) required for execution of the drawing command. Note that the CPU 40 writes image data required for drawing, into the VRAM 42d via the CPU 42b. The GPU 42b access the VRAM 42d to generate game image data for drawing.

Note that it is assumed in the present embodiment that the CPU 42b generates game image data. When any application other than game applications is executed, the GPU 42b generates image data for the application.

The DSP 42c, which functions as an audio processor, generates audio data corresponding to sound, speech or music which is to be output from the loudspeakers 34a, using sound data sound waveform (tone color) data or the like stored in the internal main memory 42e, the external main memory 46 or the like.

The image data and audio data thus generated are read out by the AV IC 56, and are then output via the AV connector 58 to the monitor 34 and the loudspeakers 34a, respectively. Therefore, a game screen is displayed on the monitor 34 while sound (music) required for a game is output from the loudspeakers 34a.

The flash memory 44, a wireless communication module 50, and a wireless controller module 52 as well as an extension connector 60 and the external memory card connector 62 are connected to the input/output processor 42a. An antenna 50a is connected to the wireless communication module 50. An antenna 52a is connected to the wireless controller module 52.

The input/output processor 42a can communicate with other game apparatuses or various servers connected to a network via the wireless communication module 50. Note that the input/output processor 42a can directly communicate with other game apparatuses without via a network. The input/output processor 42a regularly accesses the flash memory 44 to detect the presence or absence of data (transmission data) that needs to be transmitted to the network. If there is the transmission data, the input/output processor 42a transmits the transmission data via the wireless communication module 50 and the antenna 50a to the network. The input/output processor 42a also receives data (received data) transmitted from another game apparatus via the network, the antenna 50a and the wireless communication module 50, and stores the received data into the flash memory 44. Note that, in a certain case, the received data is directly discarded. Moreover, the input/output processor 42a receives data (downloaded data) downloaded from a download server via the network, the antenna 50a and the wireless communication module 50, and stores the downloaded data into the flash memory 44.

The input/output processor 42a also receives input data transmitted from the controller 22 or the load controller 36 via the antenna 52a and the wireless controller module 52, and stores (temporarily stores) the input data into a buffer area of the internal main memory 42e or the external main memory 46. The input data is utilized in a game process performed by the CPU 40 before being erased from the buffer area.

Note that, in the present embodiment, as described above, the wireless controller module 52 communicates with the controller 22 and the load controller 36 in accordance with the Bluetooth standard.

In FIG. 2, the controller 22 and the load controller 36 are shown as a single unit for the sake of convenience.

Also, the extension connector 60 and the external memory card connector 62 are connected to the input/output processor 42a. The extension connector 60 is a connector for interface, such as USB or SCSI. A medium (e.g., an external storage medium, etc.) or a peripheral device (e.g., another controller, etc.) can be connected to the extension connector 60. A wired LAN adapter can be connected to the extension connector 60, so that a wired LAN can be used instead of the wireless communication module 50. An external storage medium, such as a memory card or the like, can be connected to the external memory card connector 62. Therefore, for example, the input/output processor 42a can access an external storage medium via the extension connector 60 or the external memory card connector 62 to save or read out data.

As also shown in FIG. 1, the game apparatus 12 (housing 14) is provided with the power button 20a, the reset button 20b, and the eject button 20c. The power button 20a is connected to the system LSI 42. When the power button 20a is turned ON, power is supplied via the AC adapter (not shown) to each component of the game apparatus 12, so that the system LSI 42 is set to be in a normal conductive state (hereinafter referred to as a "normal mode"). On the other hand, when the power button 20a is turned OFF, power is supplied only to some of the components of the game apparatus 12, and the system LSI 42 is set to be in a mode in which power consumption is suppressed to a minimum level (hereinafter referred to as a "standby mode"). In the present embodiment, in the standby mode, the system LSI 42 outputs an instruction to stop power supply to components other than the input/output processor 42a, the flash memory 44, the external main memory 46, the ROM/RTC 48, the wireless communication module 50, and the wireless controller module 52. Therefore, in the standby mode, the CPU 40 does not execute an application.

Although power is supplied to the system LSI 42 even in the standby mode, a clock is not supplied to the GPU 42b, the DSP 42c or the VRAM 42d so that they are not driven, resulting in a decrease in power consumption.

Moreover, a fan for discharging heat of ICs, such as the CPU 40, the system LSI 42 and the like, is provided in the housing 14 of the game apparatus 12, though not shown. The fan is also stopped in the standby mode.

Note that, when the standby mode is not desired, then if the system LSI 42 is set so that the standby mode is not to be used, power supply to all circuit components is completely stopped when the power button 20a is turned OFF.

The normal mode and the standby mode can be switched by turning ON/OFF a power switch (one of the switches of the input means 26) of the controller 22 or by a remote operation. When the remote operation is not performed, the system LSI 42 may be set so that power is not supplied to the wireless controller module 52a in the standby mode.

The reset button 20b is also connected to the system LSI 42. When the reset button 20b is pressed, the system LSI 42 reboots the boot program of the game apparatus 12. The eject button 20c is connected to the disc drive 54. When the eject button 20c is pressed, the optical disc 18 is ejected from the disc drive 54.

Figure 3:
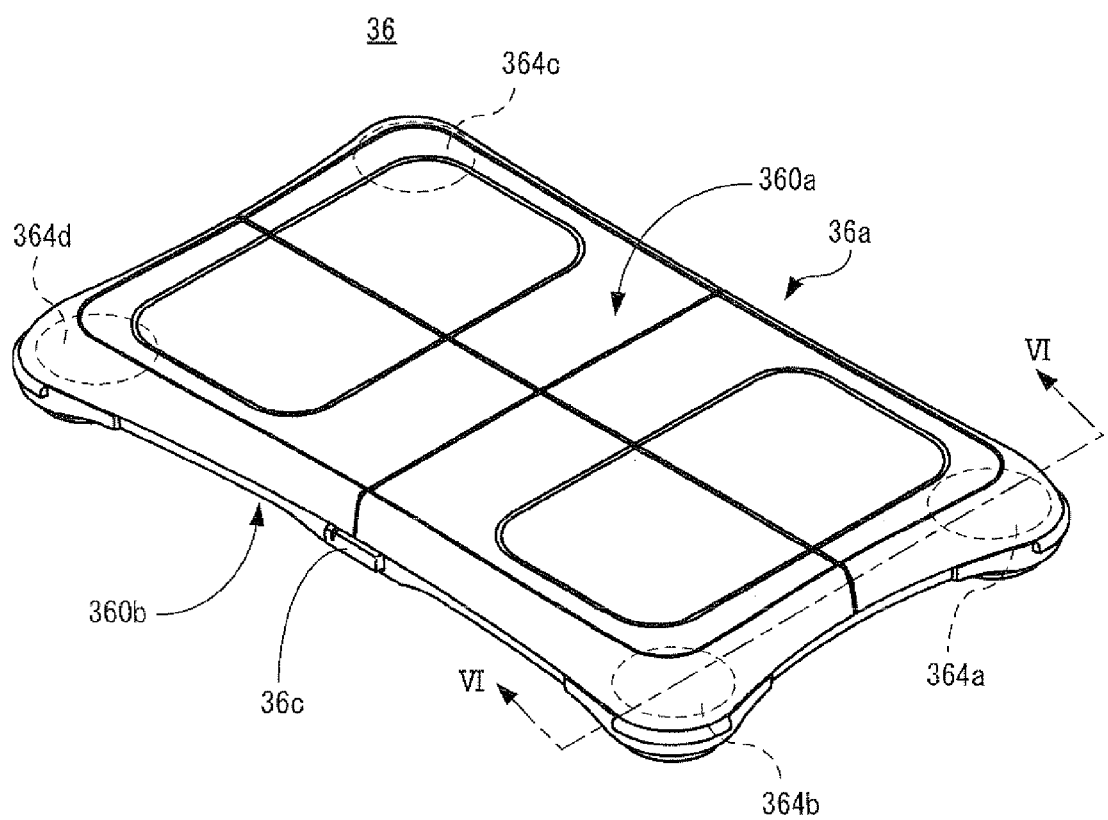
FIG. 3 is a perspective external view of a load controller 36 of FIG. 1.

FIG. 3 is a perspective external view of the load controller 36 of FIG. 1. As shown in FIG. 3, the load controller 36 includes a platform 36a on which the user stands (the user puts their foot or feet thereon), and at least four load sensors 364 (364a to 364d) for detecting a load on the platform 36a. Note that each load sensor 364 is provided inside the platform 36a (see FIG. 4) and is shown with a dashed line in FIG. 3.

The platform 36a is formed in the shape of substantially a rectangular parallelepiped, and is in the shape of substantially a rectangle as viewed from the top. For example, the short side and the long side of the rectangle are set to about 30 cm and about 50 cm, respectively. The platform 36a has a flat upper surface on which the user stands. The platform 36a has four corner side surfaces each partially sticking out in a cylindrical shape.

In the platform 36a, the four load sensors 364 are arranged at predetermined intervals. In the present embodiment, the four load sensors 364 are arranged in a periphery of the Platform 36a, specifically, at the respective four corners. The intervals at which the load sensors 364 are arranged are set to appropriate values which allow accurate detection of what is intended by a game operation depending on the way in which the user puts a load onto the platform 36a.

Figure 4:
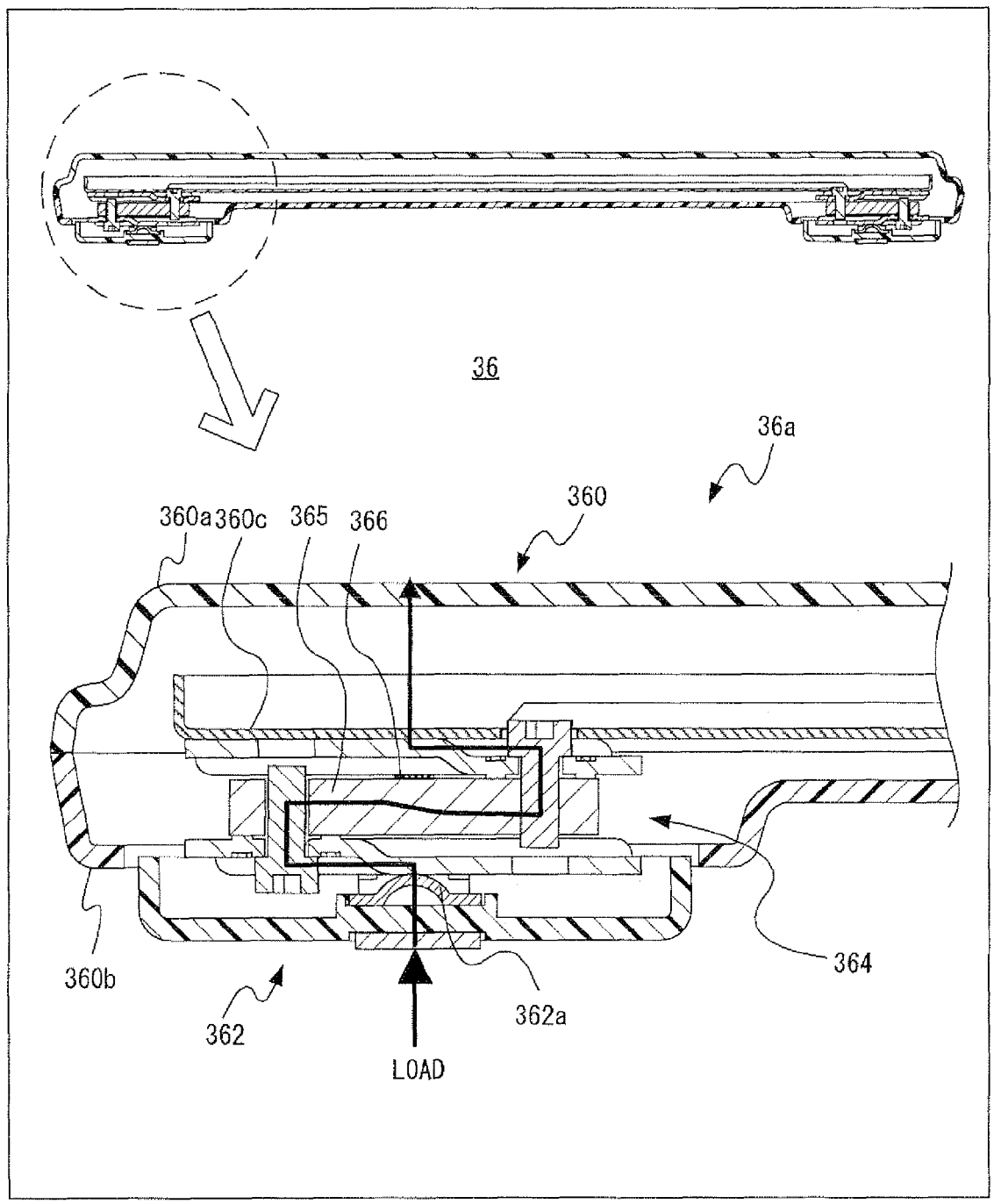
FIG. 4 is a cross-sectional view of the load controller 36 taken along line VI-VI of FIG. 3.

FIG. 4 shows a cross-sectional view of the load controller 36 taken along line VI-VI of FIG. 3 and an enlarged view of a corner portion of the load controller 36 in which a load sensor 364 is provided. As can be seen from FIG. 4, the platform 36a includes a support plate 360 on which the user stands, and legs 362. The legs 362 are provided at portions where the load sensors 364 are arranged. In the present embodiment, since the four load sensors 364 are arranged at the four corners, the four legs 362 are also provided at the four corners. Each leg 362 is formed by plastic molding in the shape of substantially a cylinder with a base. The load sensors 364 are each provided on a spherical part 362a provided on the base of the corresponding leg 362. The support plate 360 is supported by the legs 362 with the load sensors 364 being interposed therebetween.

The support plate 360 includes an upper plate 360a forming an upper surface and an upper side surface portion, a lower plate 360b forming a lower surface and a lower side surface portion, and an intermediate plate 360c provided between the upper plate 360a and the lower plate 360b. The upper plate 360a and the lower plate 360b are formed by, for example, plastic molding, and are integrated using an adhesive or the like. The intermediate plate 360c is, for example, formed of a single metal plate by press forming. The intermediate plate 360c is fixed onto the four load sensors 364. The upper plate 360a has a grid-patterned rib (not shown) on a lower surface thereof. The upper plate 360a is supported by the intermediate plate 360c with the rib being interposed therebetween. Therefore, when the user stands on the platform 36a, the load is transferred to the support plate 360, the load sensors 364 and the legs 362. As indicated with arrows in FIG. 4, reactions from a floor generated by the input load are transferred from the legs 362 via the spherical parts 362a, the load sensors 364 and the intermediate plate 360c to the upper plate 360a.

Each load sensor 364 is, for example, a strain gauge (strain sensor) load cell, which is a load transducer which converts an input load to an electrical signal. In the load sensor 364, a strain-generating body 365 is deformed, depending on an input load, resulting in strain. The strain is converted into a change of electrical resistance and is then converted into a change of voltage by a strain sensor 366 attached to the strain-generating body. Therefore, the load sensor 364 outputs a voltage signal indicating the input load, from an output terminal thereof.

Note that the load sensor 364 may be of other types, such as a tuning fork type, a string vibration type, an electrostatic capacitance type, a piezoelectric type, a magnetostrictive type, and a gyroscopic type.

Referring back to FIG. 3, the load controller 36 further includes a power button 36c. When the power button 36c is turned ON, power is supplied to each circuit component (see FIG. 5) of the load controller 36. Note that the load controller 36 may be powered ON in accordance with an instruction from the game apparatus 12. Also, the load controller 36 is powered OFF if a state in which the user does not stand on the load controller 36 continues for a predetermined period of time (e.g., 30 sec) or more. Note that, when the load controller 36 is in the active state, then if the power button 36c is turned ON, the load controller 36 may be powered OFF.

Figure 5:
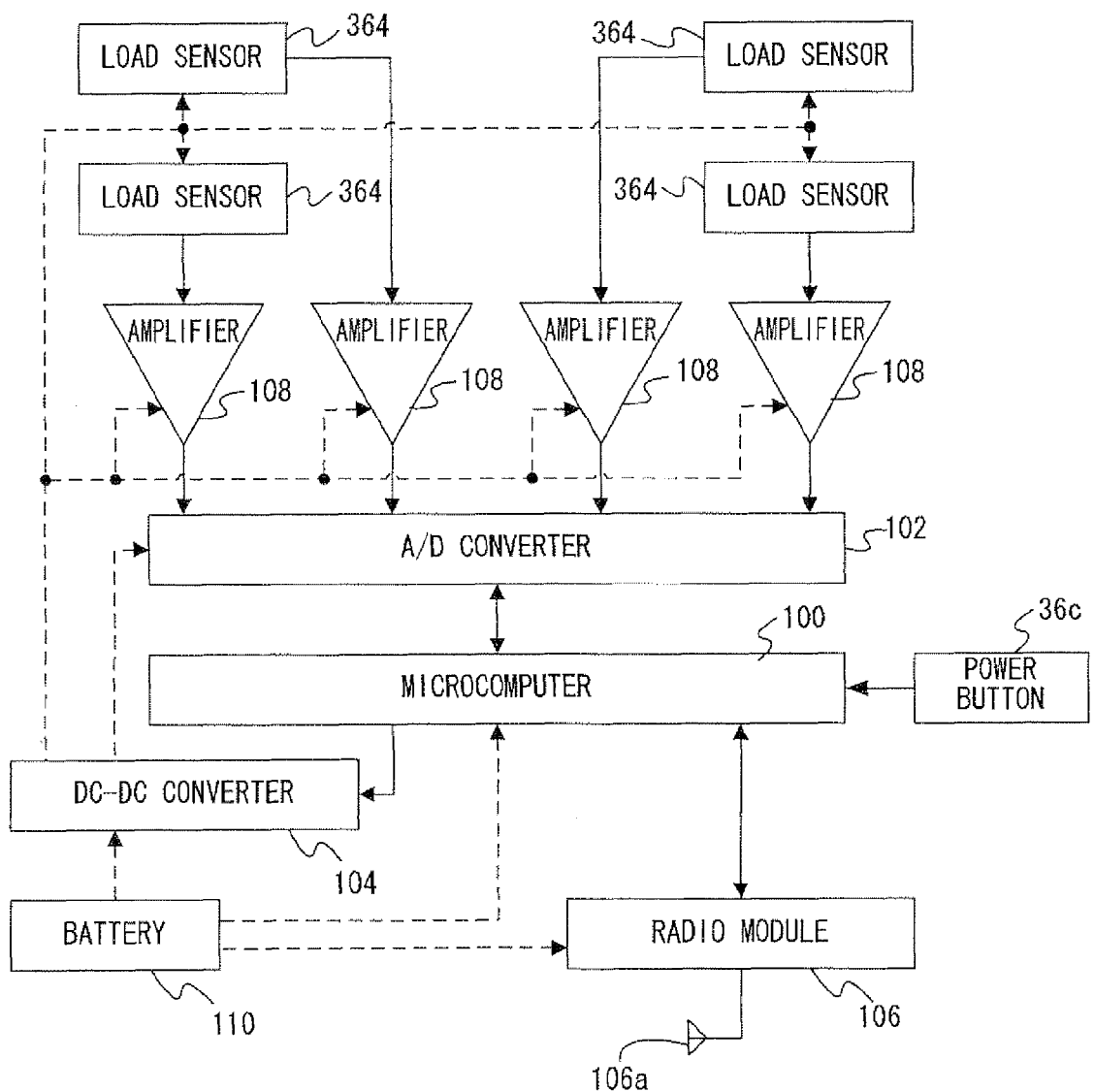
FIG. 5 is a block diagram showing an exemplary electrical configuration of the load controller 36.

FIG. 5 is a block diagram showing an exemplary electrical configuration of the load controller 36. Note that signal and communication flows are indicated by solid lines with an arrow or arrows in FIG. 5. Dashed lines with an arrow or arrows indicate supply of power.

The load controller 36 includes a microcomputer 100 for controlling the operation of the load controller 36. The microcomputer 100 includes a CPU, a ROM, a RAM and the like (not shown). The CPU controls the operation of the load controller 36 in accordance with a program stored in the ROM.

The power button 36c, an A/D converter 102, a DC-DC converter 104, and a radio module 106 are connected to the microcomputer 100. Moreover, an antenna 106a is connected to the radio module 106. The four load sensors 364 are connected via respective amplifiers 108 to the A/D converter 102.

The load controller 36 also accommodates a battery 110 for supplying power. In other embodiments, an AC adapter may be connected to the load controller 36 instead of the battery so that commercial power is supplied to the load controller 36. In this case, a power supply circuit which converts alternating current into direct current and decreases and rectifies direct voltage needs to be provided instead of the DC-DC converter. In the present embodiment, power is supplied directly from the battery 110 to the microcomputer 100 and the radio module 106. In other words, power is invariably supplied to a portion (CPU) of the components of the microcomputer 100 and the radio module 106 so as to determine whether or not the power button 36c has been turned ON or whether or not a command to power ON (detection of a load) has been transmitted from the game apparatus 12. On the other hand, power is supplied to the load sensors 364, the A/D converter 102 and the amplifiers 108 from the battery 110 via the DC-DC converter 104. The DC-DC converter 104 converts the voltage value of the direct current from the battery 110 to a different voltage value, and supplies the resultant power to the load sensors 364, the A/D converter 102 and the amplifiers 108.

The supply of power to the load sensors 364, the A/D converter 102 and the amplifiers 108 may be performed as required by the microcomputer 100 controlling the DC-DC converter 104. Specifically, the microcomputer 100, when determining that it is necessary to operate the load sensors 364 to detect a load, may control the DC-DC converter 104 to supply power to the load sensors 364, the A/D converter 102 and the amplifiers 108.

When power is supplied to the load sensors 364, each load sensor 364 outputs a signal indicating a load input thereto. The signals are amplified by the respective amplifiers 108, and are converted from analog signals into digital data by the A/D converter 102. The digital data is input to the microcomputer 100. A detected value of each load sensor 364 is given identification information of the load sensor 364. Therefore, each load sensor 364 can be identified from a corresponding detected value. Thus, the microcomputer 100 can acquire data indicating detected load values at the same time of the four load sensors 364.

On the other hand, the microcomputer 100, when determining that it is not necessary to operate the load sensors 364 (i.e., it is not the timing of load detection), controls the DC-DC converter 104 to stop the supply of power to the load sensors 364, the A/D converter 102 and the amplifiers 108. Thus, the load controller 36 can operate the load sensors 364 to detect a load only when it is required, whereby power consumption for load detection can be suppressed.

The load detection is typically required when the game apparatus 12 (FIG. 1) needs to acquire load data. For example, the game apparatus 12, when requiring load information, transmits a load acquisition command to the load controller 36. The microcomputer 100, when receiving the load acquisition command from the game apparatus 12, controls the DC-DC converter 104 to supply power to the load sensors 364 and the like so as to detect a load. On the other hand, the microcomputer 100, when not receiving the load acquisition command from the game apparatus 12, controls the DC-DC converter 104 to stop supply of power.

Alternatively, the microcomputer 100 may determine that load detection timing occurs at predetermined intervals and control the DC-DC converter 104. When the load detection is thus periodically performed, cycle information may be initially supplied and stored from the game apparatus 12 into the microcomputer 100 of the load controller 36 or may be previously stored in the microcomputer 100, for example.

Data indicating detected values from the load sensors 364 is transmitted as operation data (input data) of the load controller 36 from the microcomputer 100 via the radio module 106 and an antenna 106b to the game apparatus 12 (FIG. 1). For example, when receiving a command from the game apparatus 12 and performing the load detection, then if receiving detected value data of the load sensors 364 from the A/D converter 102, the microcomputer 100 transmits the detected value data to the game apparatus 12. Alternatively, the microcomputer 100 may transmit detected value data to the game apparatus 12 at predetermined intervals. If the cycle of the transmission is longer than the cycle of the load detection, data containing load values which are detected at a plurality of detection timings until the next transmission timing is transmitted.

Note that the radio module 106 can perform communication in accordance with the same wireless standard (Bluetooth (registered trademark), wireless LAN, etc.) as that of the wireless controller module 52 of the game apparatus 12. Therefore, the CPU 40 of the game apparatus 12 can transmit the load acquisition command via the wireless controller module 52 and the like to the load controller 36. The microcomputer 100 of the load controller 36 can receive the command via the radio module 106 and the antenna 106a from the game apparatus 12, and transmit input data containing a detected load value (or a calculated load value) of each load sensor 364 to the game apparatus 12.

For example, in a game which is executed based on a simple sum of four load values detected by the four load sensors 364, the user is permitted to stand at any position with respect to the four load sensors 364 of the load controller 36, i.e., the user is permitted to stand on the platform 36a at any position and in any orientation to play a game. In some kinds of games, however, the direction of a load value detected by each load sensor 364 as viewed from the user needs to be identified, i.e., a positional relationship between the four load sensors 364 of the load controller 36 and the user needs to be recognized. In this case, for example, the positional relationship between the four load sensors 364 and the user may be previously defined, and the user may be supposed to stand on the platform 36a in a manner which allows the predetermined positional relationship. Typically, positional relationship in which there are two load sensors 364 in front of, behind, to the right of, and to the left of the user standing at a middle of the platform 36a, i.e., a positional relationship in which, when the user stands at a middle of the platform 36a of the load controller 36, there is a load sensor 364 in front right, front left, rear right and rear left directions with respect to the user as a center, is defined. In this case of the present embodiment, the platform 36a of the load controller 36 is in the shape of a rectangle as viewed from the top and the power button 36c is provided at one side (long side) of the rectangle. Therefore, it is previously ruled that the user should stand on the platform 36a using the power button 36c as a guide in a manner which allows the long side at which the power button 36c is provided to be located in a predetermined direction (front, rear, left or right). In this case, a load value detected by each load sensor 364 is a load value of a predetermined direction (front right, front left, rear right, and rear left) as viewed from the user. Therefore, the load controller 36 and the game apparatus 12 can find out a direction to which each detected load value corresponds as viewed from the user, based on the identification information of the load sensors 364 contained in the detected load value data and arrangement data indicating previously set (stored) positions or directions of the load sensors 364 with respect to the user. As a result, for example, it is possible to recognize what is intended by a game operation input by the user, such as forward, backward, rightward and leftward operation directions and the like.

Note that the arrangement of the load sensors 364 with respect to the user may not be previously defined, and may be input and set by the user during initial setting or during a game. For example, a screen may be displayed which instructs the user to stand on a portion in a predetermined direction (front left, front right, rear left, rear right, etc.) as viewed from the user, and load values may be acquired, so that a positional relationship between the load sensors 364 and the user can be specified, and therefore, arrangement data may be generated and stored based on these settings. Alternatively, a screen for selecting an arrangement of the load controllers 36 may be displayed on the monitor 34 to cause the user to select a direction in which a guide (the power button 36c) is located as viewed from the user by an input using the controller 22. Arrangement data of the load sensors 364 may be generated and stored based on the selection.

[General Outline of Game Process]

Figure 6:
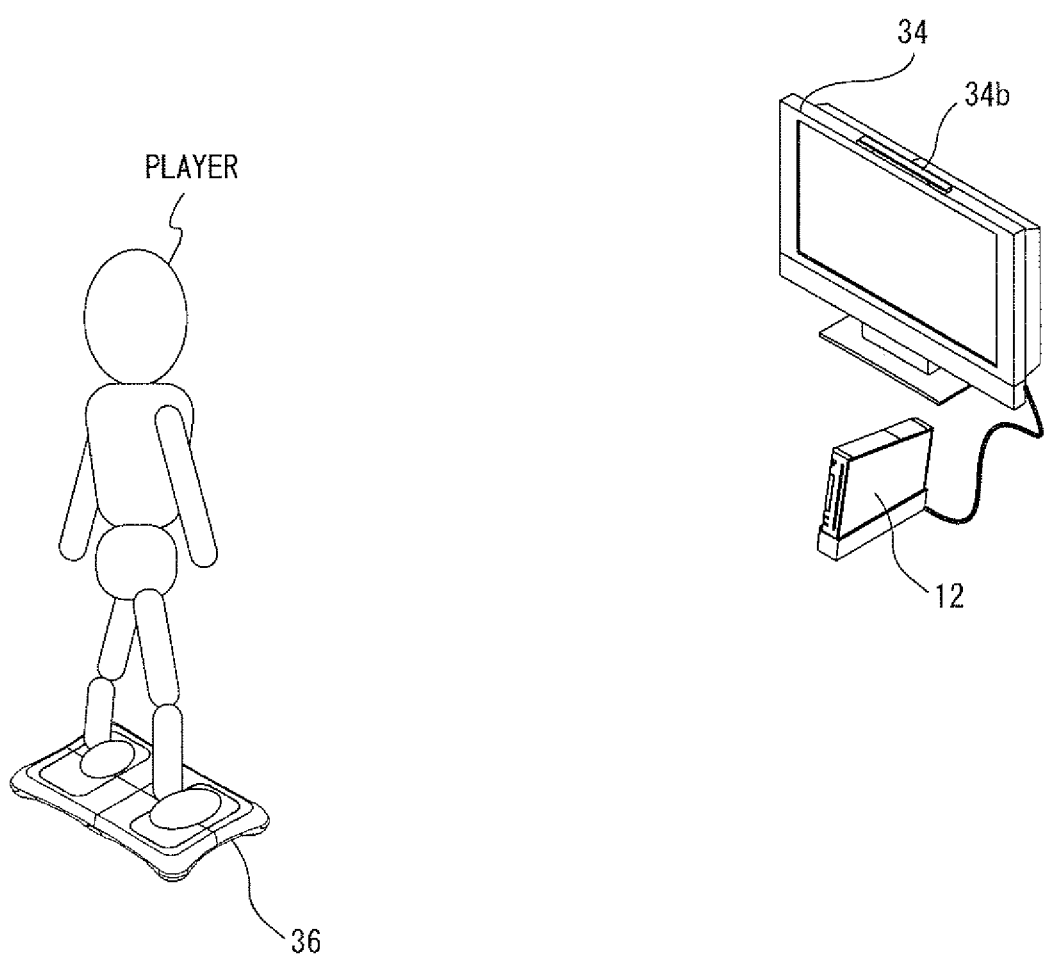
FIG. 6 is a diagram showing an appearance in which a player stands on the load controller 36 and plays a game according to the embodiment.

Next, a general outline of a game process according to an embodiment of the present invention will be described with reference to FIGS. 6 and 7. FIG. 6 is a diagram showing an appearance in which a player stands on the load controller 36 and plays a game according to the present embodiment. As shown in FIG. 6, the player stands on the load controller 36 while facing the screen of the monitor 34. The load controller 36 is placed such that the longitudinal direction thereof is perpendicular to the direction toward the screen (which is referred to as a crosswise placement).

Figure 7A:
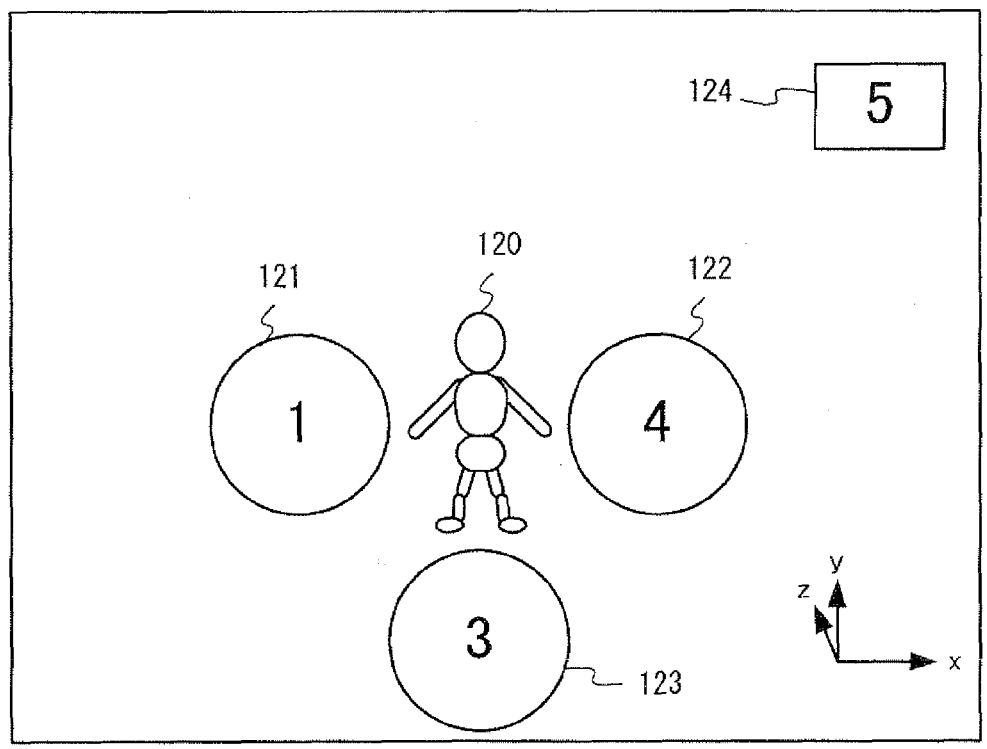
FIG. 7A is a diagram showing an exemplary screen for the game according to the present embodiment.

In the present embodiment, a game in which the player stands on the load controller 36 and performs a hip swing action is assumed. Specifically, in a game according to the present embodiment, the player performs the hip swing action while solving a question displayed on the screen of the monitor 34, and thereby answers the question. FIG. 7A is a diagram showing an exemplary screen for the game according to the present embodiment. As shown in FIG. 7A, a player character 120, selection objects 121 to 123, and a question display area 124 are displayed on the screen. The player character 120 is a character to be operated by the player, and acts in response to the hip swing action of the player. The player character 120 stands in a game space while facing the far side of the screen. That is, the back of the player character 120 is displayed on the screen. Therefore, for example, if the player swings his/her hip to the right, an appearance in which the player character 120 swings its hip to the right of the screen is displayed. The selection objects 121 to 123 are displayed around a position at which the player character 120 is displayed. Specifically, the selection object 121 is displayed to the left of the player character 120, the selection object 122 is displayed to the right of the player character 120, and the selection object 123 is displayed to the rear of the player character 120. The selection objects 121 to 123 are objects to be selected by the player, and a number is displayed on each selection object. A question is displayed in the question display area 124, and specifically a number is displayed therein. In the game according to the present embodiment, the player selects two or more of the selection objects 121 to 123 such that a sum of the numbers displayed on the selected selection objects 121 to 123 equals the number displayed in the question display area 124.

For example, in a question shown in FIG. 7A, the number displayed in the question display area 124 is "5". The number displayed in the selection object 121 is "1", the number displayed in the selection object 122 is "4", and the number displayed in the selection object 123 is "3". In such a question, in order to make the sum of the numbers displayed on the selection objects 121 to 123 equal the number displayed in the question display area 124, the player needs to select the selection object 121 and the selection object 122. When the player selects the selection object 121 and the selection object 122, it means that the player gives a correct answer to the question.

Figure 7B:
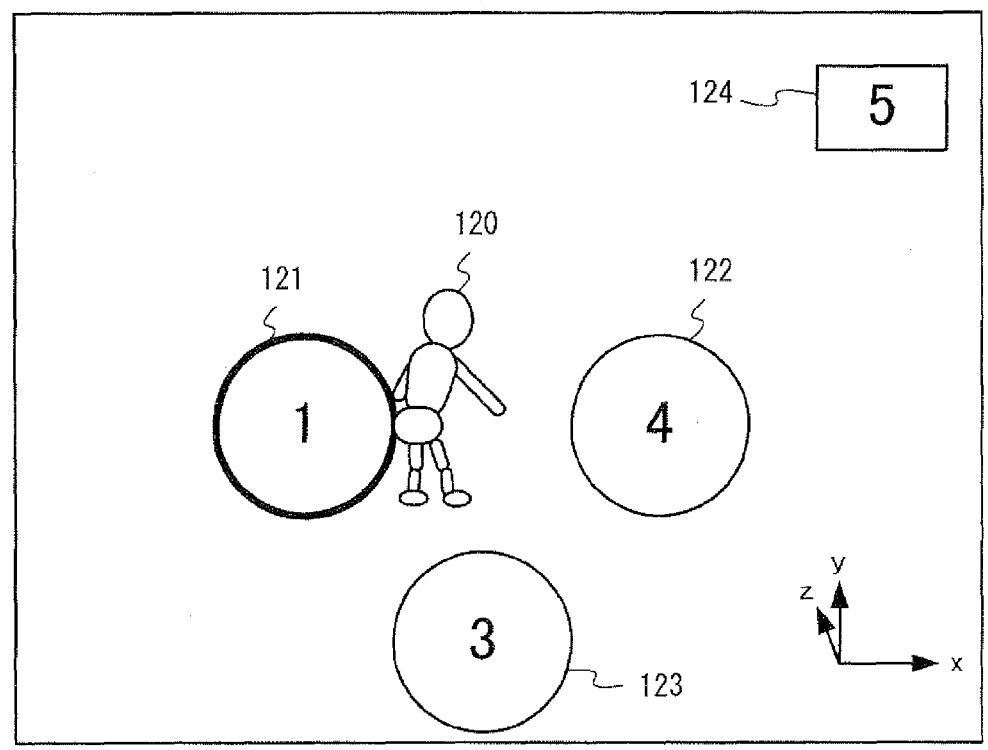
FIG. 7B is a diagram showing an appearance in which a player character 120 swings its hip to the left in response to an action of the player swinging his/her hip to the left, and a selection object 121 is selected.

The selection of the selection objects 121 to 123 is performed by the player swinging his/her hip. FIG. 73 is a diagram showing an appearance in which the player character 120 swings its hip to the left in response to an action of the player swinging his/her hip to the left, and the selection object 121 is selected. In FIG. 7B, an appearance in which the player character 120 swings its hip to the left is shown. In this case, the player, on the load controller 36, performs an action of swinging his/her hip to the left. Then, the appearance in which the player character 120 swings its hip to the left is displayed on the screen, and the selection object 121 located to the left of the player character 120 is selected. As shown in FIG. 73, when the selection object 121 is selected, the object 121 is highlighted (the selection object 121 is displayed in a vibrating manner or the color of the selection object 121 is changed) so that it can be easily recognized that the object 121 is selected. Then, the player performs an action of swinging his/her hip to the right so as to select the selection object 122 in order to give the correct answer to the question. Then, an appearance in which the player character 120 swings its hip to the right is displayed on the screen, and the selection object 122 located to the right of the player character 120 is selected.

As described above, in the game according to the present embodiment, the player selects the selection object displayed on the screen, by swinging his/her hip to the front, rear, left, and right. The player selects the selection objects so as to make the sum of the numbers displayed on the selected selection object equal the number displayed in the question display area 124. When the answer given by the player is correct, an indication that the answer is correct is displayed, and a next question is presented. In the game according to the present embodiment, a score is calculated based on the number of questions to which the player has given correct answers within a predetermined time limit. In this manner, the player adds numbers in his/her head, and at the same time performs the action of swinging his/her hip, thereby enjoying the game in which the player can train the brain while exercising.

Next, a method for a hip swing determination (determination of in which direction, front, rear, left, or right, the player swings his/her hip) performed by the game apparatus 12 will be described. In the present embodiment, a first hip swing determination and a second hip swing determination are performed. The first hip swing determination is performed based on a center-of-gravity position and a load value of the player, which are detected by the load controller 36. The second hip swing determination is a hip swing determination based on the center-of-gravity position. In the following, a method for calculating the center-of-gravity position of the player will be firstly described, and then the first hip swing determination will be described.

Figure 8A:
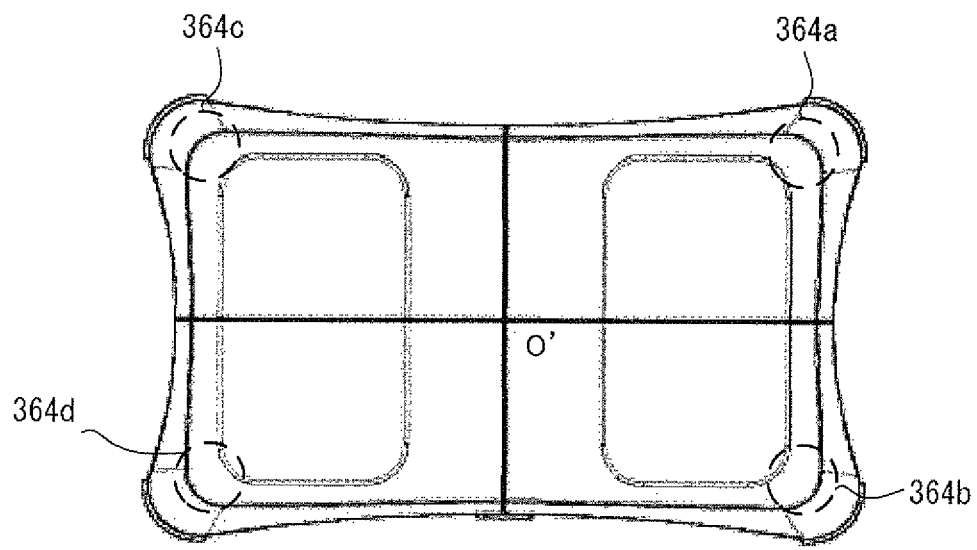
FIG. 8A is a top view of the load controller 36.
Figure 8B:
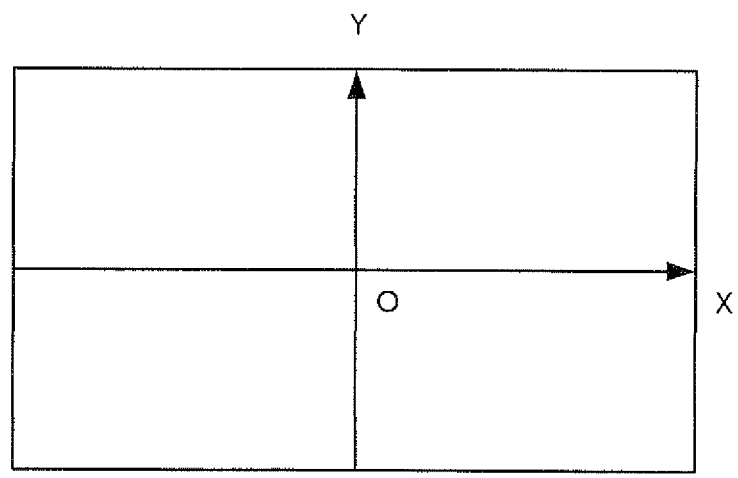
FIG. 8B is a diagram showing an XY coordinate system corresponding to a position on a platform 36a of the load controller 36.

The center-of-gravity position is a center-of-gravity position of a load applied to the platform 36a of the load controller 36, and is defined by load values detected by the load sensors 364a to 364d of the load controller 36. The center-of-gravity position is represented by coordinate values of an XY coordinate system corresponding to a position on the platform 36a of the load controller 36. FIG. 8A is a top view of the load controller 36. FIG. 8B is a diagram showing the XY coordinate system corresponding to a position on the platform 36a of the load controller 36. In FIG. 8A, a region to the right of a center O' (in which the load sensors 364a and 364b are contained) is a region on which the player places his/her right foot. A region to the left of the center O' (in which the load sensors 364c and 364d are contained) is a region on which the player places his/her left foot. As shown in FIGS. 8A and 8B, a position on the platform 36a of the load controller 36 corresponds to a position in the XY coordinate system, and, for example, the center O' of the platform 36a corresponds to the origin O of the XY coordinate system.

Here, when a load value detected by the load sensor 364a is defined as a, a load value detected by the load sensor 364b is defined as b, a load value detected by the load sensor 364c is defined as c, and a load value detected by the load sensor 364d is defined as d, an X-coordinate value (XG) and a Y-coordinate value (YG) of the center of gravity is calculated based on the following equations (1) and (2).

$$XG=((a+b-c-d)/\text{reference weight})\times m-\text{initial } X\text{-coordinate value} \quad (1)$$

$$YG=((a+c-b-d)/\text{reference weight})\times n-\text{initial } Y\text{-coordinate value} \quad (2)$$

Here, m and n are predetermined constants. The center-of-gravity position (XG, YG) is calculated based on $-1 \leq XG \leq 1$ and $-1 \leq YG \leq 1$. The reference weight is the total value (that is, the weight of the player) of the load values detected by the respective load sensors 364 at the time when the player motionlessly stands on the load controller 36. The reference weight is measured when the game is started. The initial X-coordinate value is a correction value for an X-axis center-of-gravity position, and is an X-coordinate value of the center of gravity detected when the player motionlessly stands on the load controller 36 at the time of start of the game. Likewise, the initial Y-coordinate value is a correction value for a Y-axis center-of-gravity position, and is a Y-coordinate value of the center of gravity detected when the player motionlessly stands on the load controller 36 at the time of start of the game. When the player stands at a correct position on the platform 36a with a correct posture (when the player places his/her feet at predetermined positions on the platform 36a across the center O' and stands still while putting his/her weight on both the legs in a balanced manner) the center-of-gravity position is located at the origin O of the XY coordinate system. However, actually, it is difficult to stand at the correct position with the correct posture, and therefore, when the player stands on the platform 36a, a detected center-of-gravity position is deviated from the origin O. This deviation differs depending on a manner in which the player stands on the platform 36a. Accordingly, a deviation of the center-of-gravity position, due to the difference of the manner in which the player stands, is detected when the game is started, and a center-of-gravity position detected during the game is corrected. Thereby, an action of the player can be accurately determined. The foregoing equations for calculating the center-of-gravity position are merely examples, and the center-of-gravity position may be calculated by using other methods.

Next, the first hip swing determination will be described. Firstly, a change of the center-of-gravity position and a change of the load value, at the time when the player performs the hip swing action, will be described. When the player performs the hip swing action, the center-of-gravity position changes. This is because, when the player swings his/her hip, the weight moves in a direction in which the hip is swung. On the other hand, when the player swings his/her hip, the center-of-gravity position sometimes transiently moves in a direction different from the direction intended by the player. FIG. 9A is a diagram showing a change of the center-of-gravity position at a time when the player swings his/her hip to the right. FIG. 9A shows a shift from a center-of-gravity position P1, which is obtained immediately after the player starts the hip swing action, to a center-of-gravity position P21, which is obtained at the time when the player completes the hip swing action. The center-of-gravity position P2 is a center-of-gravity position obtained when a predetermined time period (for example, 1/60 sec; also referred to as a 1-frame time) elapses after the center-of-gravity position P1 is detected. The center-of-gravity position P3 is a center-of-gravity position obtained when another 1-frame time elapses after the center-of-gravity position P2 is detected. That is, in FIG. 9A, the center-of-gravity position Pi (i is a positive integer from 1 to 21) indicates a center-of-gravity position obtained when an i-frame time elapses immediately after the player starts the hip swing action.

As shown in FIG. 9A, when the player swings his/her hip to the right, the center of gravity transiently moves to the left, and then the center of gravity moves to the right. The reason therefor is as follows. That is, when the player tries to swing his/her hip to the right, the weight transiently moves to the left leg, as a reaction. Specifically, when the player tries to apply a rightward force to his/her hip in order to swing his/her hip to the right, a leftward force is applied to his/her whole body due to the law of inertia. Thus, for counteracting the leftward force, the player unconsciously stands firmly on his/her left leg. Therefore, when the player swings his/her hip to the right, the center of gravity transiently moves to the left. Here, an unconscious action involving the transient movement of the center of gravity is called a "preliminary action". In the preliminary action, after the player starts the rightward hip swing action, the center-of-gravity position moves to the left, and then, in reversal, the center-of-gravity position moves to the right. The preliminary action is terminated, around the time when the X-coordinate value of the center of gravity exceeds 0. That is, in FIG. 9A, the preliminary action is started at the time of the center-of-gravity position P1, and terminated at the time around the center-of-gravity position 212. When the preliminary action is terminated, the center-of-gravity position moves in a direction (rightward) in which the player swings his/her hip.

In the present embodiment, a change of the load value in accordance with the hip swing action of the player is detected, in order to eliminate a detection of the hip swing action in the direction opposite to the direction intended by the player, which is due to the preliminary action, and to accurately detect the hip swing action intended by the player. When the player performs the hip swing action, a load value detected by the load controller 36 (the total value of load values detected by the respective load sensors 364) changes. FIG. 9B is a diagram showing a change of a load value detected by the load controller 36 at the time when the player swings his/her nip to the right. In FIG. 9B, the vertical axis represents a weight ratio (a value obtained by dividing a detected load value by the reference weight), and the horizontal axis represents a time (frame time) having elapsed since the time when the player starts the hip swing action. In FIG. 9B, each point Wi (i is a positive integer from 1 to 21) indicates a load value (the total value of load values detected by the respective load sensors 364) at the time of detection of the center-of-gravity position Pi shown in FIG. 9A.

As shown in FIG. 93, during a period from when the player starts the rightward hip swing action to when the preliminary action is terminated (from the time of W1 to the time of W12), the load value gradually increases, shows the local maximum value (W7) in the middle, and then decreases. At the time when the preliminary action is terminated (at the time of W12), the load value shows the local minimum value (minimum value). Then, the load value increases again (from W12 to W20). The cause of this change of the load value is as follows.

As described above, when the player tries to swing his/her hip to the right, the weight transiently moves to his/her left leg, as a reaction (P1 to P7 in FIG. 9A, and W1 to W7 in FIG. 9B). When, along with this weight movement, the player stands firmly supporting the weight on his/her left leg, a force directed vertically downward is applied to the load controller 36. Accordingly, during a period in which the center-of-gravity position moves to the left in the preliminary action (a period from P1 to P7), the load value detected by the load controller 36 is greater than the weight of the player (from W1 to W7). After the player stands firmly supporting the weight on his/her left leg, a force directed vertically upward is applied to the leg (more specifically, the left leg) of the player, as a reaction. This force directed vertically upward causes acceleration directed vertically upward to act on the body of the player, and therefore the load value detected by the load controller 36 decreases (from W7 to W12). Then, when the preliminary action is terminated, the hip of the player starts to move to the right of the center O' of the platform 36a, due to the force applied by the player in order to swing his/her hip to the right. When the hip of the player moves to the right, the center-of-gravity position moves to the right of the origin O (P12 and the subsequent points). Thus, the weight of the player is imposed on the right leg, and the player stands strongly firmly supporting the weight on his/her right leg, for maintaining a balance. In accordance with the force caused by standing strongly firmly, a force directed vertically downward is applied to the load controller 36, and the load value detected by the load controller 36 increases (from W12 to W20). A rate of increase of the load value at this time is larger than a rate of increase of the load in the preliminary action. This is because the player consciously moves the weight in a hip swing direction (to the right) while, in the preliminary action, the player unconsciously applies a force to his/her left leg to support the weight moving to the left. When the player consciously moves the weight, the player stands more firmly on his/her right leg in order to maintain a balance.

As described above, when the player performs the hip swing action, the center-of-gravity position and the load value change. In the present embodiment, in which direction the player swings his/her hip is determined based on a change of the center-of-gravity position and a change of the load value. Specifically, whether or not the amount of change of the load value within a predetermined time period (predetermined frame time) is equal to or greater than a predetermined threshold value is determined (a load determination is performed). A direction in which the center-of-gravity position moves, which is obtained at the time when the amount of change is equal to or greater than the threshold value, is defined as the direction in which the player swings his/her hip. For example, when the change of the load value shown in FIG. 95 is detected, the amount of change of the load value in a period from the 1-frame time to the 7-frame time (from W1 to W7) is smaller than the threshold value, and thus a result of the load determination is negative. Accordingly, a direction in which the center-of-gravity position moves during this period is not used for the hip swing determination (in this period, it is not determined that the player swings his/her hip). On the other hand, the amount of change in a period from the 13-frame time to the 20-frame time (from W13 to W20) is equal to or greater than the threshold value, and thus the result of the load determination is affirmative. Accordingly, a direction in which the center-of-gravity position detected during this period moves is calculated as the direction in which the player swings his/her hip (it is determined that the player swings his/her hip in the direction in which the center-of-gravity position moves during this period).

Figure 10:
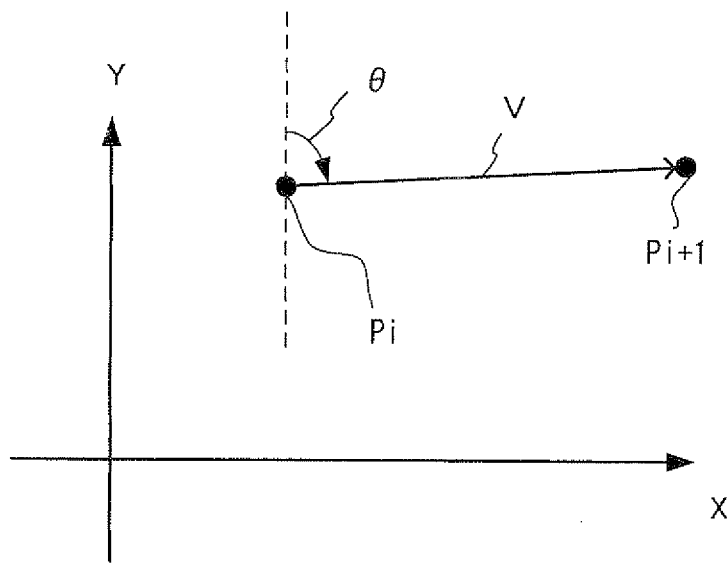
FIG. 10 is a diagram showing a method for calculating a direction in which the player swings his/her hip, based on a direction in which the center-of-gravity position moves.

FIG. 10 is a diagram showing a method for calculating a direction in which the player swings his/her hip, based on a direction in which the center-of-gravity position moves. In FIG. 10, a point Pi indicates the center-of-gravity position at an i-frame time, and a point Pi+1 indicates the center-of-gravity position at an i+1-frame time. As shown in FIG. 10, the direction in which the center-of-gravity position moves at the i-frame time is defined based on a vector V of which the start point is the center-of-gravity position Pi and the end point is the center-of-gravity position Pi+1. Specifically, the direction in which the center-of-gravity position moves is calculated based on an angle θ formed between the vector V and the Y-axis. For example, when the angle θ is in the range of −30 to 30 degrees, the direction in which the center-of-gravity position moves is defined to be "front", and when the angle θ is in the range of 30 to 150 degrees, the direction in which the center-of-gravity position moves is defined to be "right". When the angle θ is in the range of −150 to −30 degrees, the direction in which the center-of-gravity position moves is defined to be "left", and when the angle θ is in the range of −180 to −150 degrees or in the range of 150 to 180 degrees, the direction in which the center-of-gravity position moves is defined to be "rear". Thus, the calculated direction in which the center-of-gravity position moves is defined as the direction in which the player swings his/her hip.

Next, the second hip swing determination (a hip swing determination based on the center-of-gravity position) will be described. When the player swings his/her hip in a relatively slow manner, the result of the load determination described above is always negative even though the player swings his/her hip. Thus, the result of the first hip swing determination is always negative. That is, when the player swings his/her hip in a relatively slow manner, a change of the load value is small. This is because, when the player swings his/her hip in a relatively slow manner, the above-described change of the center-of-gravity position does not rapidly occur and the player can maintain a balance even though the player does not stand firm. For example, in accordance with the player slowly swinging his/her hip to the right, the center-of-gravity position (weight) of the player also slowly moves to the right. When the center-of-gravity position moves to the right, the player places more of the weight on his/her right leg in order to maintain a balance along with the movement. When the center-of-gravity position moves at a slow speed, the player slowly moves the weight to his/her right leg. Thus, the player does not stand strongly firm on his/her right leg as described above, and the load controller 36 does not receive a large load. That is, when the player slowly swings his/her hip to the right, load values detected by the load sensors 364a and 364b increase but load values detected by the load sensors 364c and 364d decrease by the amount equal to the amount of the increase. As a result, the total of the load values detected by the respective load sensors 364a to 364d changes little.

Figure 11:
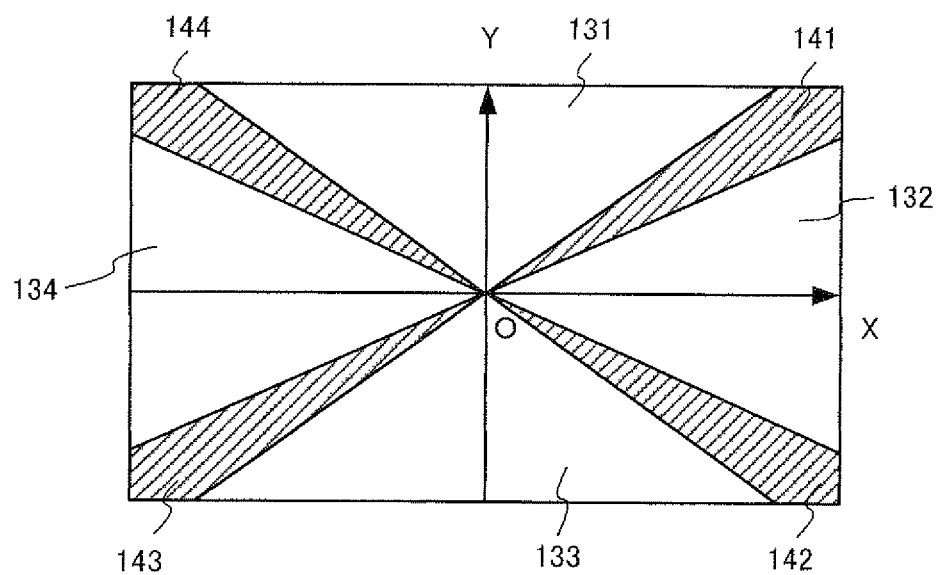
FIG. 11 is a diagram showing a swing direction based on the center-of-gravity position.

Accordingly, in the present embodiment, even when the result of the load determination is negative, the game apparatus determines that the player swings his/her hip if the center-of-gravity position is at a predetermined position, which is the second hip swing determination. Specifically, in the present embodiment, the direction in which the player swings his/her hip is firstly determined based on the detected center-of-gravity position. FIG. 11 is a diagram showing a swing direction based on the center-of-gravity position. As shown in FIG. 11, regions 131, 132, 133, and 134 are preset in the XY coordinate system (on the platform 36a). In addition, regions 141, 142, 143, and 144 are set in diagonal directions of the XY coordinate system. When the center-of-gravity position is in the regions 131, 132, 133, and 134, the direction in which the player swings his/her hip is defined to be "front", "right", "rear", and "left", respectively. Hereinafter, the regions 131, 132, 133, and 134 are called a front region, a right region, a rear region, and a left region, respectively.

Thus, when the amount by which the detected center-of-gravity position moves from the origin O is equal to or greater than a predetermined threshold value, it is determined that the player swings his/her hip in a hip swing direction defined in the above-described manner. Specifically, when the center-of-gravity position exists in any of the regions 131 to 134, and if the absolute value of a coordinate value of the center of gravity is equal to or larger than the predetermined threshold value, it is determined that the player swings his/her hip in the direction indicated by the region where the center-of-gravity position exists. For example, when the center-of-gravity position exists in the region 131, and if the Y coordinate value of the center of gravity is equal to or greater than the predetermined threshold value (e.g., 0.7), it is determined that the player swings his/her hip to the front. Also, when the center-of-gravity position exists in the region 132, and if the X coordinate value of the center of gravity is equal to or greater than the predetermined threshold value (e.g., 0.6), it is determined that the player swings his/her hip to the right. In the same manner, when the center-of-gravity position exists in the region 133, and if the Y coordinate value of the center of gravity is equal to or less than the predetermined threshold value (e.g., −0.7), it is determined that the player swings his/her hip to the rear. Also, when the center-of-gravity position exists in the region 134, and if the X coordinate value of the center of gravity is equal to or less than the predetermined threshold value (e.g., −0.6), it is determined that the player swings his/her hip to the left.

On the other hand, the regions 141 to 144 are provided on the platform 36a. As shown in FIG. 11, each of the regions 141 to 144 is a region surrounded by an outer edge of the platform 36a and two straight lines extending diagonally from the center O' on the platform 36a, and the regions 141 to 144 are preset. When the detected center-of-gravity position exists in any of the regions 141 to 144, the hip swing direction of the player is not defined, and it is determined that the player does not swing his/her hip. This is because, when the center-of-gravity position exists in any of these regions, the hip swing direction of the player cannot be clearly defined. For example, when the center-of-gravity position exists between the regions 131 and 132, then if the region 141 for which the hip swing determination is not performed does not exist, the hip swing direction changes in accordance with a change of the center-of-gravity position which is caused by a slight movement of the player. That is, if the region 141 does not exist, a result of a determination of the hip swing direction is switched between the front and the right by a slight movement of the player. Accordingly, such switching can be prevented by the regions 141 to 144 being provided at the boundaries between the regions 131 to 134.

A region for which it is not determined that the player swings his/her hip is called an "invalid region". That is, the invalid region is a region including the above-described regions 141 to 144, or a region (a rectangular region centered at the origin O, and having a long side of 1.4 and a short side of 1.2) in which the absolute value of an X-coordinate value and the absolute value of a Y-coordinate value are less than predetermined threshold values, respectively. On the other hand, in the regions 131 to 134, a region for which it is determined that the player swings his/her hip is called a "valid region". To be specific, an overlap region where the region 131 overlaps a region (a region on and above the straight line of Y=0.7) in which the Y-coordinate value is equal to or greater than the predetermined threshold value (0.7) is called a "front valid region", and an overlap region where the region 133 overlaps a region (a region on and below the straight line of Y=−0.7) in which the Y-coordinate value is equal to or less than the predetermined threshold value (−0.7) is called a "rear valid region". In the same manner, an overlap region where the region 132 overlaps a region (a region on and to the right of the straight line of X=0.6) in which the X-coordinate value is equal to or greater than the predetermined threshold value (0.6) is called a "right valid region", and an overlap region where the region 134 overlaps a region (a region on and to the left of the straight line of X=−0.6) in which the X-coordinate value is less than the predetermined threshold value (−0.6) is called a "left valid region".

[Details of Game Process]

Figure 12:
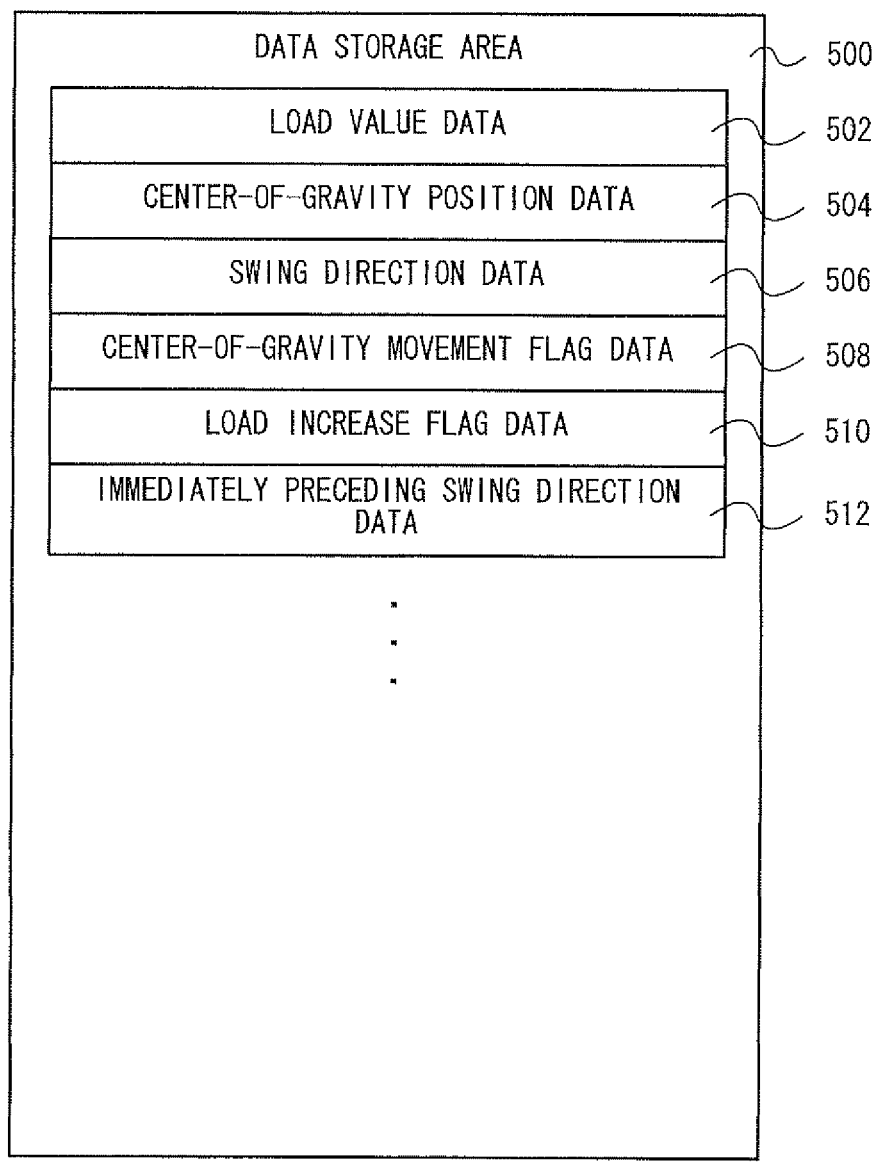
FIG. 12 is a diagram showing main data stored in a main memory (an external main memory 46 or an internal main memory 42e) of a game apparatus 12.

Next, details of the game process performed by the game apparatus 12 will be described with reference to FIGS. 12 to 16. Firstly, main data used in processing by the game apparatus 12 will be described with reference to FIG. 12. FIG. 12 is a diagram showing main data stored in the main memory (the external main memory 46 or the internal main memory 42e) of the game apparatus 12.

As shown in FIG. 12, load value data 502, center-of-gravity position data 504, swing direction data 506, center-of-gravity movement flag data 508, load increase flag data 510, and immediately preceding swing direction data 512 are stored in a data storage area 500 of the main memory of the game apparatus 12. In the main memory, not only the data shown in FIG. 12 but also data required for the game process, such as image data of various objects (the player object 120, the selection objects 121 to 123, and an object indicating the question display area 124) appearing in the game, data indicating various parameters for the objects, and the like, are stored. In addition, a game program for the execution of the game process is stored in a program area of the main memory. Moreover, since operation data (data indicating load values detected by the respective load sensors 364a to 364d) is transmitted from the load controller 36 to the game apparatus 12, every 1/200 seconds for example, the game apparatus 12 (CPU 40) temporarily stores the operation data in the buffer area provided in the main memory.

The load value data 502 is a collection of data each indicating a load value detected by the load controller 36. That is, the load value data 502 is a collection of data indicating the total value of load values detected by the respective load sensors 364a to 364d of the load controller 36. Specifically, the load value data 502 is an array, and data indicating the aforesaid total load value is stored in each element of the array in chronological order.

The center-of-gravity position data 504 is a collection of data each indicating the center-of-gravity position which is calculated in accordance with the aforesaid equations (1) and (2) based on the load values detected by the respective load sensors 364a to 364d. Specifically, the center-of-gravity position data 504 is an array, and data indicating the center-of-gravity position is stored in each element of the array in chronological order.

The swing direction data 506 is data indicating a direction in which the player swings his/her hip, and is data for storing a result of the determination of the hip swing direction. The swing direction data 506 is represented by, for example, a numerical value from 1 to 4.

The center-of-gravity movement flag data 508 indicates a value of a center-of-gravity movement flag. The center-of-gravity movement flag indicates whether or not a movement of the center of gravity satisfies a predetermined condition.

The load increase flag data 510 indicates a value of a load increase flag. The load increase flag indicates whether or not the load value detected by the load controller 36 tends to increase.

The immediately preceding swing direction data 512 is data indicating the hip swing direction of the player, which is determined in the immediately preceding hip swing determination. In the game according to the present embodiment, the hip swing determination is repeatedly performed, and therefore a value (e.g., a value from 1 to 4) indicating the hip swing direction determined in the immediately preceding hip swing determination is stored in the immediately preceding swing direction data 512. In addition, a value (e.g., 0) indicating that the immediately preceding hip swing direction is cleared may sometimes be stored in the immediately preceding swing direction data 512.

Figure 13:
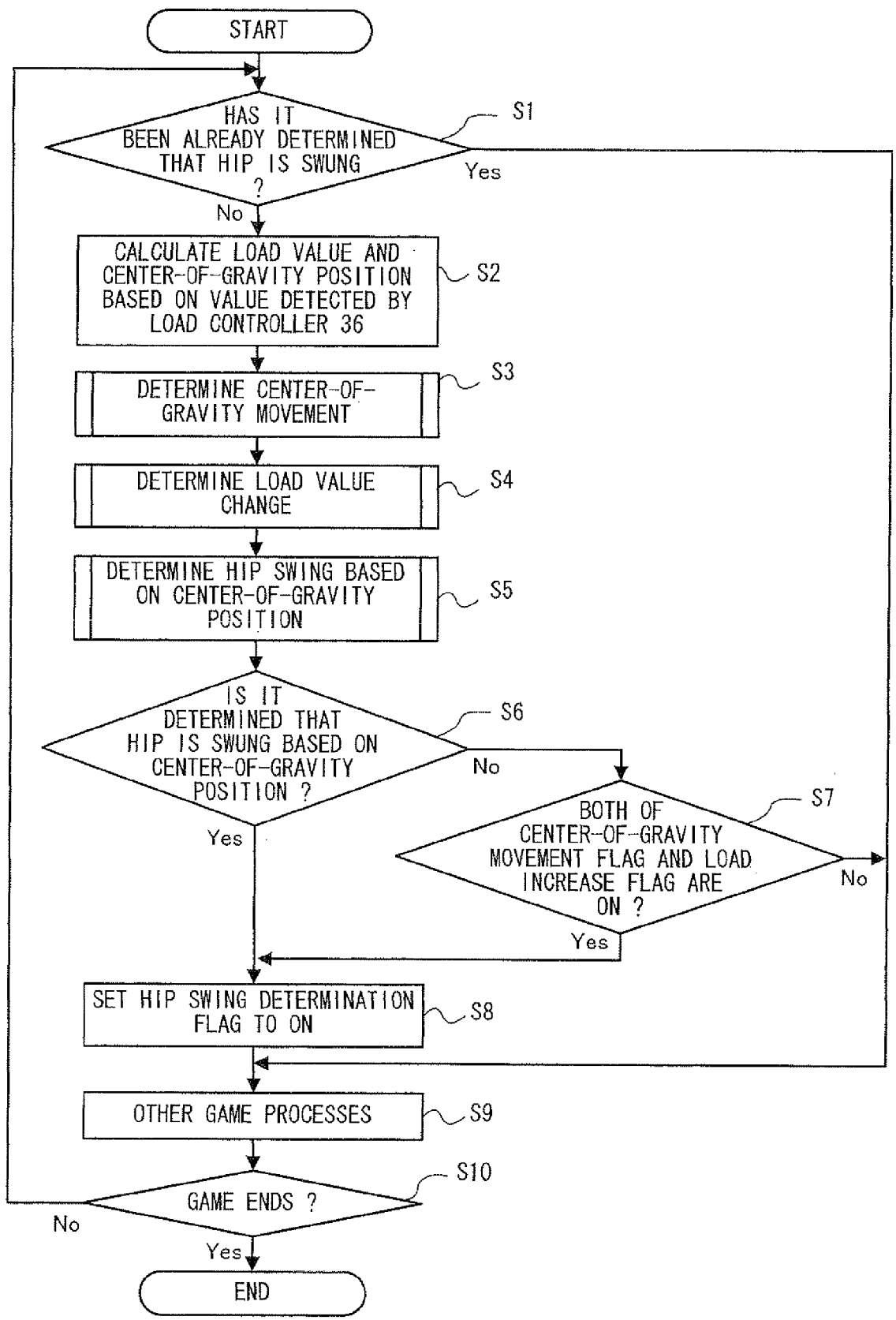
FIG. 13 is a main flow chart showing a sequence of a game process performed by the game apparatus 12.

Next, the game process performed by the game apparatus 12 will be described with reference to FIG. 13. FIG. 13 is a main flow chart showing a sequence of the game process performed by the game apparatus 12. When the game apparatus 12 is powered on, the CPU 40 of the game apparatus 12 executes a boot program stored in the ROM/RTC 48 to initialize each unit such as the external main memory 46. Then, the game program stored in the optical disc 18 is loaded to the main memory, and the CPU 40 starts executing the game program. Then, the CPU 40 performs an initial setting. In the initial setting, the CPU 40 causes a character string prompting the player to stand on the load controller 36 to be displayed on the monitor 34, and calculates the reference weight of the player, and the correction value (the initial X-coordinate value and the initial Y-coordinate value in the aforesaid equations (1) and (2)) for the center-of-gravity position. Moreover, in the initial setting, the player object 120, the selection objects 121 to 123, and the like, are arranged in the game space. The flow chart of FIG. 13 shows the game process performed after the above-described processing is completed. In FIG. 13, game processes which are not directly relevant to the present invention will not be described. A loop of processes at steps S1 to S10 shown in FIG. 13 is repeatedly performed once in each frame (for example, 1/60 sec; the aforesaid frame time).

Firstly, at step S1, the CPU 40 determines whether or not it has been already determined that the hip is swung. Here, whether or not it has been determined that the hip is swung based on the processes at steps S2 to S8, which will be described later, is determined. When it is determined that the hip has been swung, a process subsequent to the hip swing determination is performed at step S9 which will be described later. That is, when the hip swing determination has been already performed, an appearance in which the player character 120 swings its hip is displayed or a result of a determination of whether or not a correct answer to a question is presented is displayed, at step S9. When the process at step S9 subsequent to the hip swing determination is completed, the result of the determination at step S1 becomes negative, and the processes at steps S2 to S8 are re-executed (a new hip swing determination is performed). Specifically, at step S1, the CPU 40 refers to a hip swing determination flag (S8 which will be described later) stored in the main memory, and determines whether or not the hip swing determination flag is ON. When a result of the determination is negative, the CPU 40 then executes the process at step S2 in order to perform a hip swing determination. When the result of the determination is affirmative, the CPU 40 then executes the process at step S9.

At step S2, the CPU 40 calculates a load value and a center-of-gravity position based on a value detected by the load controller 36. Specifically, the CPU 40 refers to the buffer area of the main memory, and calculates the total value of load values detected by the respective load sensors 364a to 364d. Then, the CPU 40 stores, in the main memory, the calculated total value (the load value detected by the load controller 36) as the load value data 502. In addition, the CPU 40 substitutes the load values detected by the respective load sensors 364a to 364d into the aforesaid equations (1) and (2), to thereby calculate the center-of-gravity position. Then, the CPU 40 stores, in the main memory, the calculated center-of-gravity position as the center-of-gravity position data 504. Then, the CPU 40 executes the process at step S3.

Figure 14:
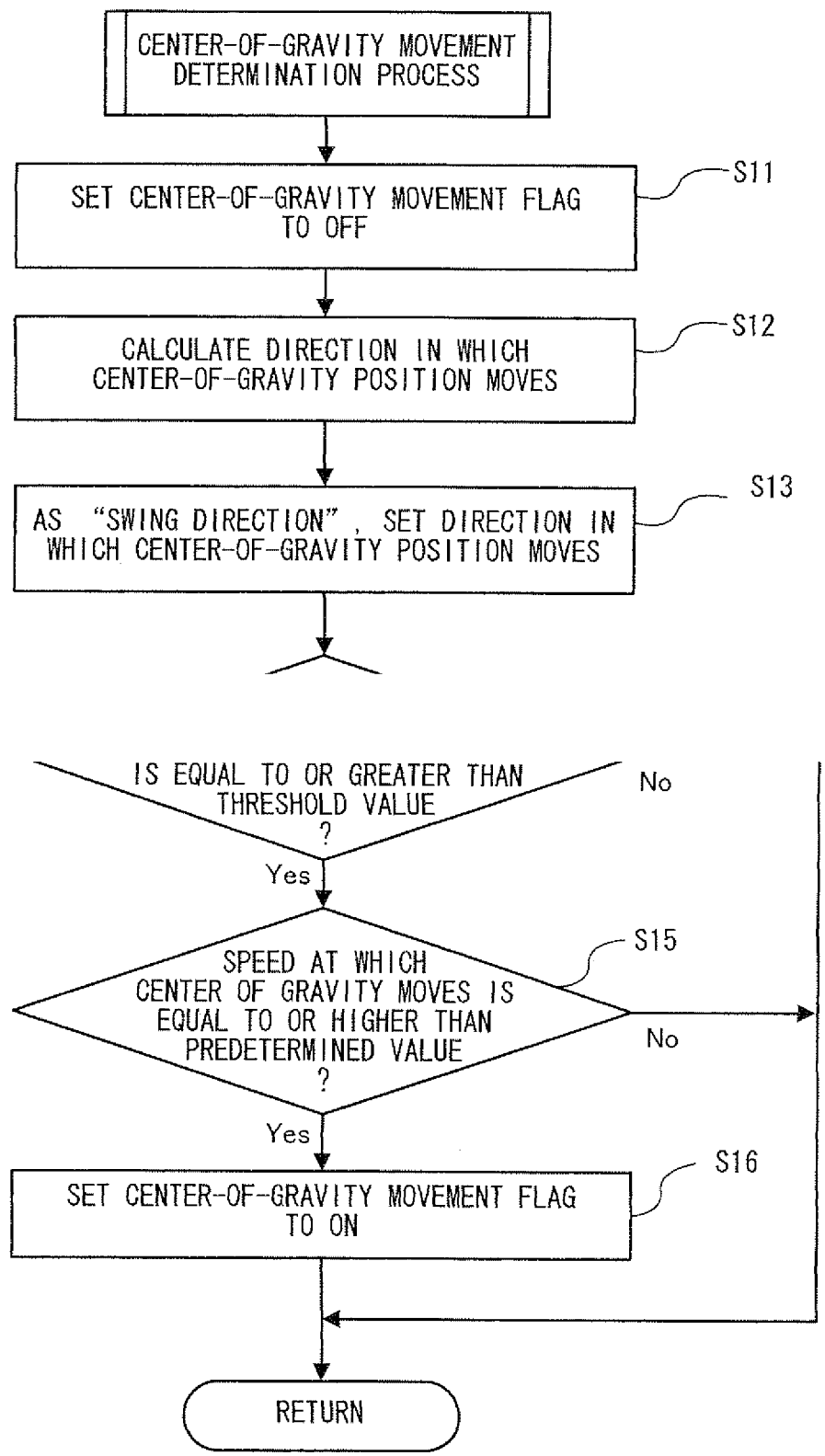
FIG. 14 is a flow chart showing a detail of a center-of-gravity movement determination process (S3)

At step S3, the CPU 40 executes a center-of-gravity movement determination process. The processes at steps S3 and S4 are processes concerning the above-described first hip swing determination. The process at step S3 is a (determination of whether or not a movement of the center-of-gravity position satisfies a predetermined condition. The center-of-gravity movement determination process at step S3 will be described in detail with reference to FIG. 14. FIG. 14 is a flow chart showing a detail of the center-of-gravity movement determination process (S3).

Firstly, at step S11, the CPU 40 sets the center-of-gravity movement flag to OFF. Specifically, the CPU 40 sets the center-of-gravity movement flag to OFF, and stores, in the main memory, the flag as the center-of-gravity movement flag data 508. Then, the CPU 40 executes the process at step S12.

At step S12, the CPU 40 calculates a direction in which the center-of-gravity position moves. Specifically, the CPU 40 refers to the center-of-gravity position data 504, and acquires the most recent center-of-gravity position and the immediately preceding center-of-gravity position. The most recent center-of-gravity position means the center-of-gravity position calculated at step S2 in the current loop of processes. The immediately preceding center-of-gravity position means the center-of-gravity position calculated at step S2 in the immediately preceding loop of processes. Then, the CPU 40 calculates a vector V (see FIG. 10) extending from the acquired immediately preceding center-of-gravity position to the acquired most recent center-of-gravity position. Thus, the CPU 40 calculates an angle θ formed between the calculated vector V and a unit vector in the Y-axis positive direction. The CPU 40 calculates a direction in which the center-of-gravity position moves, in accordance with a value of the calculated angle θ. That is, as described above, the CPU 40 determines that the direction is any one of the directions of "front", "right", "rear", and "left", in accordance with the value of the angle θ. Subsequently, the CPU 40 executes the process at step S13.

At step S13, the CPU 40 sets, as a "swing direction", the direction in which the center-of-gravity position moves which has been calculated at step S12. For example, when the direction in which the center-of-gravity position moves which has been calculated at step 312 is "front", the CPU 40 sets a value (e.g., 1) indicating the front, in the swing direction data 506, and stores the swing direction data 506 in the main memory. Then, the CPU 40 executes the process at step S14.

At step S14, the CPU 40 determines whether or not the value representing the center-of-gravity position is equal to or greater than a threshold value. In the process at step S14, whether or not the current (most recent) center-of-gravity position is at a predetermined distance or more from the origin O is determined. When the current center-of-gravity position exists in a predetermined region centered at the origin O, it is not determined that the player swings his/her hip. Specifically, the CPU 40 refers to the center-of-gravity position data 504, and acquires the current center-of-gravity position. When the direction in which the center-of-gravity position moves which has been calculated at step S12 is "right" or "left", the CPU 40 determines whether or not the absolute value of an X-coordinate value of the acquired center-of-gravity position is equal to or greater than a predetermined threshold value (e.g., 0.2). When the direction in which the center-of-gravity position moves which has been calculated at step S12 is "front" or "rear", the CPU 40 determines whether or not the absolute value of a Y-coordinate value of the acquired center of gravity is equal to or greater than a predetermined threshold value (e.g., 0.4). When a result of the determination is affirmative, then the CPU 40 executes the process at step S15. On the other hand, when the result of the determination is negative, the CPU 40 terminates the center-of-gravity movement determination process shown in FIG. 14.

At step S15, the CPU 40 determines whether or not a speed at which the center-of-gravity position moves is equal to or higher than a predetermined value. Specifically, the CPU 40: refers to the center-of-gravity position data 504; calculates a current speed (a scalar) at which the center-of-gravity position moves; and determines whether or not the magnitude of the speed of movement thus calculated is equal to or greater than a predetermined value. More specifically, the CPU 40 refers to the center-of-gravity position data 504, and calculates the distance between the most recent center-of-gravity position and the immediately preceding center-of-gravity position. Subsequently, the CPU 40 divides the calculated distance by the frame time (e.g., 1/60 sec), to thereby calculate a current speed at which the center-of-gravity position moves. Then, the CPU 40 determines whether or not the magnitude of the speed of movement thus calculated is equal to or greater than a predetermined value. The foregoing predetermined value may be different between when the direction in which the center-of-gravity position moves is a longitudinal direction ("front" or "rear") and when the direction in which the center-of-gravity position moves is a lateral direction ("right" or "left"). For example, the threshold value used when the direction in which the center-of-gravity position moves is rear may be maximum, and the threshold value used when the direction in which the center-of-gravity position moves is front may be minimum. In general, it is easier for the player to swing his/her hip to the rear than to the front. In addition, it is easier for the player to swing his/her hip to the left or right than to the front. Accordingly, the threshold value may be set high with respect to the direction in which the player easily swings his/her hip, and may be set low with respect to the direction in which the player does not easily swing his/her hip. When a result of the determination is affirmative, the CPU 40 then executes the process at step S16. On the other hand, when the result of the determination is negative, the CPU 40 terminates the center-of-gravity movement determination process shown in FIG. 14.

At step S16, the CPU 40 sets the center-of-gravity movement flag to ON. Specifically, the CPU 40 sets the center-of-gravity movement flag to ON, and stores, in the main memory, the flag as the center-of-gravity movement flag data 508. Subsequently, the CPU 40 terminates the center-of-gravity movement determination process shown in FIG. 14.

As described above, at step S14, whether or not the value representing the center-of-gravity position is equal to or greater than the threshold value is determined, and at step S15, whether or not the speed at which the center-of-gravity position moves is equal to or higher than the predetermined value is determined. Thereby, the first hip swing determination can be performed with an increased accuracy. That is, for example, when the player consciously swings his/her hip to the right, the center-of-gravity position moves to the right so as to be located to the right of the origin O by a predetermined distance or more. Moreover, when the player consciously swings his/her hip to the right, the center-of-gravity position moves to the right, and the speed of movement at that time becomes equal to or higher than the predetermined value. Conversely, even when the player does not consciously swing his/her hip and stays upright, the center-of-gravity position always changes near the origin O. Therefore, by setting the threshold values for the value representing the center-of-gravity position and for the speed at which the center-of-gravity position moves, the hip swing action performed consciously by the player can be determined with an increased accuracy.

Figure 15:
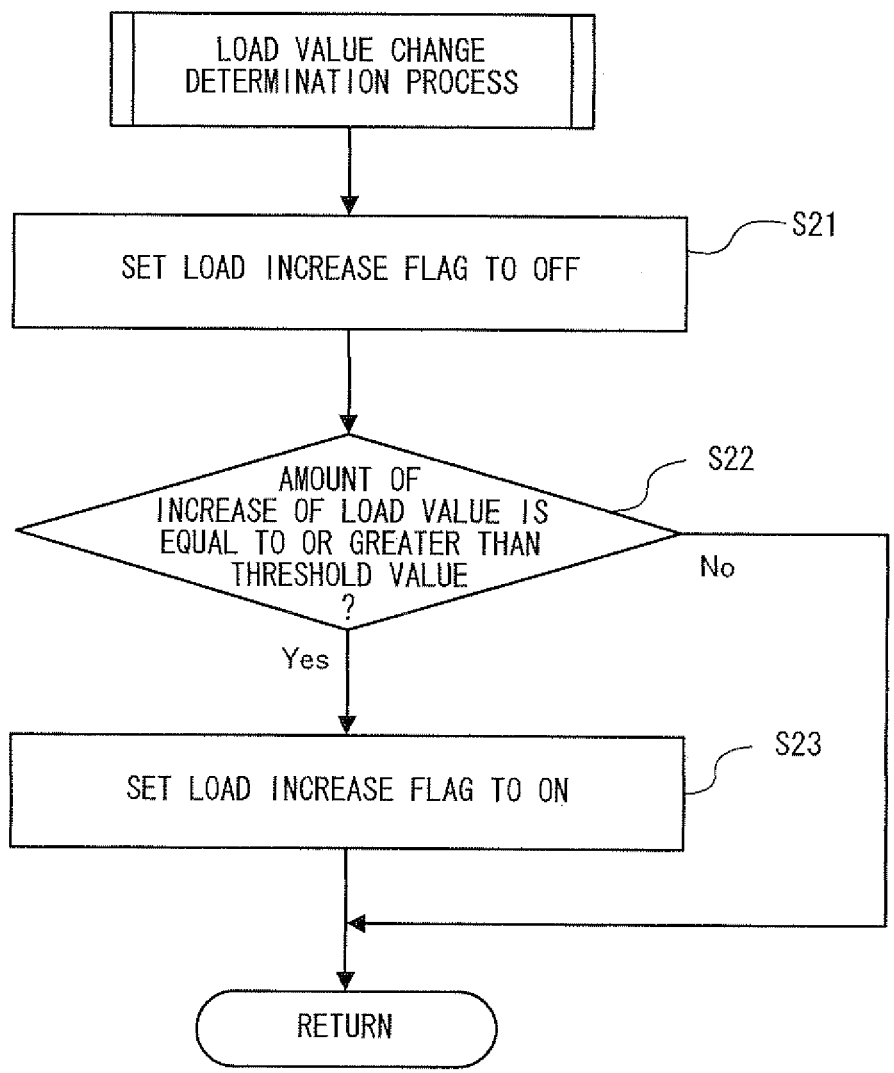
FIG. 15 is a flowchart showing a detail of a load value change determination process (S4)

Returning to FIG. 13, the CPU 40 then executes the process at step S4. At step S4, the CPU 40 executes a load value change determination process. The process at step S4 is a determination of whether or not the load value detected by the load controller 36 increases. The load value change determination process at step S4 will be described in detail with reference to FIG. 15. FIG. 15 is a flow chart showing a detail of the load value change determination process (S4).

At step S21, the CPU 40 sets the load increase flag to OFF. Specifically, the CPU 40 sets the load increase flag to OFF, and stores, in the main memory, the flag as the load increase flag data 510. Then, the CPU 40 executes the process at step S22.

At step S22, the CPU 40 determines whether or not the amount of increase of the load value is equal to or greater than a threshold value. In the process at step S22, whether or not the load value detected by the load controller 36 tends to increase and in addition a rate of the increase is equal to or higher than a predetermined rate is determined. Specifically, the CPU 40 refers to the load value data 502, and acquires the most recent load value and the load value of a predetermined frame time ago (e.g., the 4-frame time ago). Then, the CPU 40 determines whether or not a value obtained by subtracting the load value of the predetermined frame time ago from the most recent load value is equal to or greater than a predetermined threshold value. When a result of the determination is affirmative, the CPU 40 then executes the process at step S23. On the other hand, when the result of the determination is negative, the CPU 40 terminates the load value change determination process shown in FIG. 15.

At step S23, the CPU 40 sets the load increase flag to ON. Since it is determined at step S22 that the load value increases at the predetermined rate or higher, the load increase flag indicating that the load value tends to increase is set to ON at step S23. Specifically, the CPU 40 sets the load increase flag to ON, and stores, in the main memory, the flag as the load increase flag data 510. Subsequently, the CPU 40 terminates the load value change determination process shown in FIG. 15.

Figure 16:
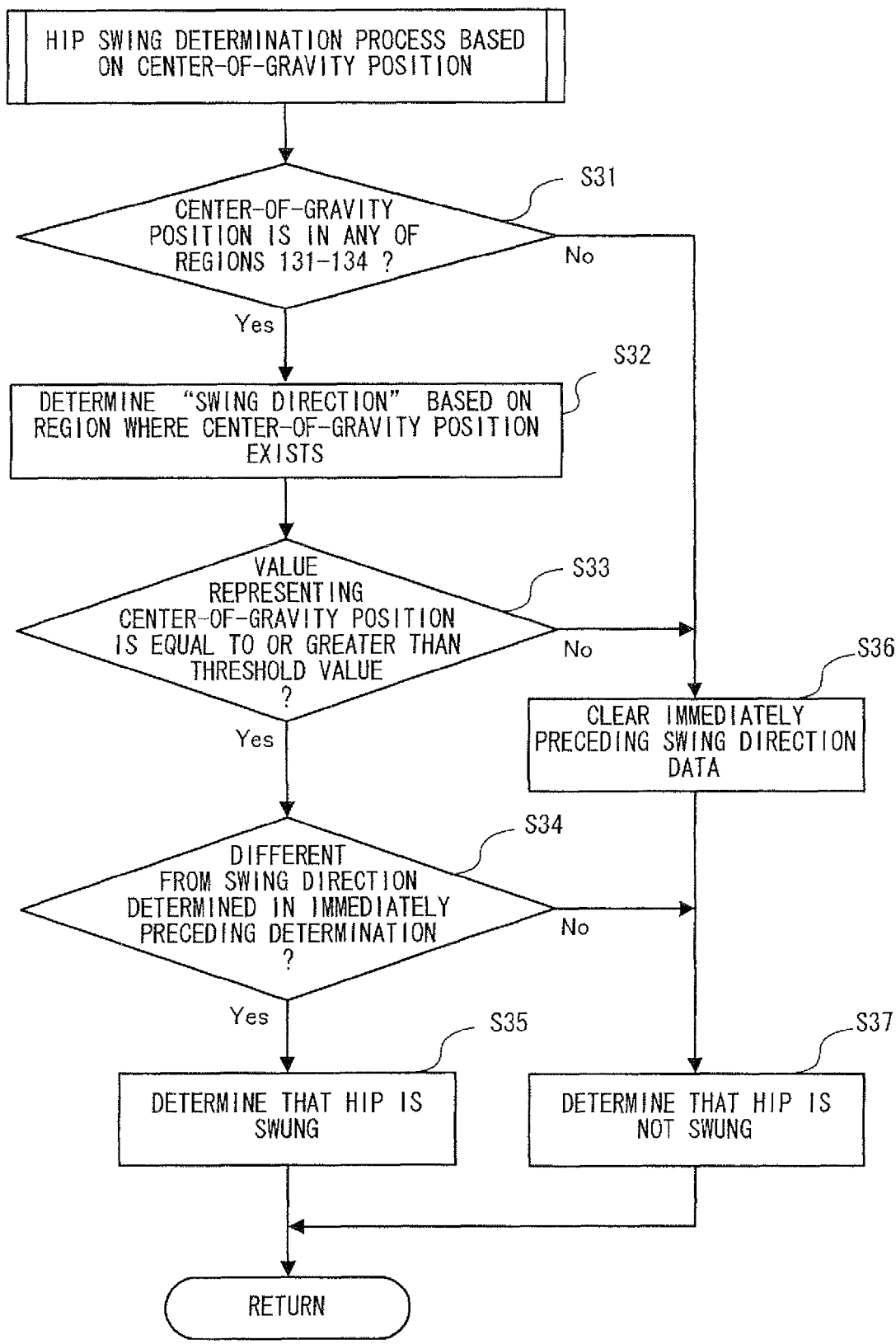
FIG. 16 is a flow chart showing a detail of a hip swing determination process (S5) based on the center-of-gravity position.

Returning to FIG. 13, the CPU 40 then executes the process at step S5. At step S5, the CPU 40 executes a hip swing determination process based on the center-of-gravity position. The process at step S5 includes a determination of a direction in which the player swings his/her hip and a determination of whether or not the player swings his/her hip, which are performed based only on the current center-of-gravity position. The process at step S5 is the above-described second hip swing determination process. The hip swing determination process based on the center-of-gravity position at step S5 will be described in detail with reference to FIG. 16. FIG. 16 is a flow chart showing a detail of the hip swing determination process (S5) based on the center-of-gravity position.

At step S31, the CPU 40 determines whether or not the current center-of-gravity position exists in any of the regions 131 to 134. Specifically, the CPU 40 refers to the center-of-gravity position data 504, and acquires the most recent center-of-gravity position. Then, the CPU 40 determines whether or not the acquired center-of-gravity position exists in any of the regions 131 to 134 shown in FIG. 11. When a result of the determination is affirmative, the CPU 40 then executes the process at step S32. When the result of the determination is negative, the CPU 40 then executes the process at step S36.

At step S32, the CPU 40 determines a hip swing direction based on the region where the center-of-gravity position exists. Specifically, the CPU 40 refers to the center-of-gravity position data 504, and acquires the most recent center-of-gravity position. The CPU 40 determines which of the regions 131 to 134 shown in FIG. 11 the acquired most recent center-of-gravity position exists in. For example, when the acquired most recent center-of-gravity position exists in the region 131 (front region), the CPU 40 determines that the hip swing direction is "front". Also, when the acquired most recent center-of-gravity position exists in the region 132 (right region), the CPU 40 determines that the hip swing direction is "right". In the same manner, when the acquired most recent center-of-gravity position exists in the region 133 (rear region), the CPU 40 determines that the hip swing direction is "rear". Also, when the acquired most recent center-of-gravity position exists in the region 134 (left region), the CPU 40 determines that the hip swing direction is "left". Then, the CPU 40 stores, in the main memory, the hip swing direction thus determined, as the swing direction data 506.

At step S33, the CPU 40 determines whether or not the value representing the center-of-gravity position is equal to or greater than a threshold value. The process at step S33 is similar to the process at step S14, but different therefrom in terms of the threshold value. Specifically, the CPU 40 refers to the center-of-gravity position data 504, and acquires the current (most recent) center-of-gravity position. When the hip swing direction determined at step S32 is the lateral direction ("right" or "left"), the CPU 40 determines whether or not the absolute value of the X-coordinate value of the acquired center-of-gravity position is equal to or greater than a predetermined threshold value (e.g., 0.6). When the hip swine direction determined at step S32 is the longitudinal direction ("front" or "rear"), the CPU 40 determines whether or not the absolute value of the Y-coordinate value of the acquired center-of-gravity position is equal to or greater than a predetermined threshold value (e.g., 0.7). When a result of the determination is affirmative, the CPU 40 then executes the process at step S34. On the other hand, when the result of the determination is negative, the CPU 40 executes the process at step S36.

At step S34, the CPU 40 determines whether or not the swing direction determined in the current hip swing determination is different from the swing direction determined in the immediately preceding hip swing determination. This is a process for preventing the performance of successive determinations that the hip is swung in the same direction. For example, when it is determined that the swing direction is right in the immediately preceding hip swing determination, then if the center-of-gravity position exists in the right region (region 132) during a period from the immediately preceding hip swing determination to the current hip swing determination, it is not determined that the hip is swung. That is, when the player keeps the weight to the right until the current hip swing determination after the player swings his/her hip to the right in the immediately preceding hip swing action (an action of swinging the hip in order to select the selection object), it is not determined that the hip is swung, because the player does not consciously swing his/her hip. This can prevent the hip swing determination from being performed based on a hip swing unintentionally made by the player. Specifically, at step S34, the CPU 40 refers to the swing direction data 506 and the immediately preceding swing direction data 512, and determines whether or not the current swing direction is different from the immediately preceding swing direction. When a result of the determination is affirmative, the CPU 40 then executes the process at step S35. When the result of the determination is negative, the CPU 40 then executes the process at step S37.

At step S35, the CPU 40 determines that the hip is swung, based on the center-of-gravity position. Specifically, the CPU 40 stores, in the main memory, data indicating that it is determined that the hip is swung based on the center-of-gravity position. After step S35, the CPU 40 terminates the hip swing determination process based on the center-of-gravity position.

On the other hand, at step S36, the CPU 40 clears the immediately preceding swing direction data 512. Here, it is a process of setting the swing direction determined in the immediately preceding hip swing determination, to a direction different from any of the aforesaid four directions (front, rear, right, and left). As described above, at step S34, whether or not the swing direction determined in the immediately preceding determination is different from the current swing direction is determined, and, only when the current swing direction is different from the immediately preceding swing direction, it is determined that the hip is swung (step S35). However, when the player consciously swings his/her hip in the same direction in both the immediately preceding determination and the current determination, it is necessary to determine that the hip is swung, in the current hip swing determination. In a case where the center-of-gravity position moves to a position represented by a value less than the threshold value shown at step S33, it is assumed that the player is returning his/her hip to the original position during the period from the immediately preceding hip swing determination to the current hip swing determination. For example, in a case where the player swings his/her hip to the right for a second consecutive time, the player swings his/her hip to the right (a first hip swing action), returns the hip, and then swings his/her hip to the right again (a second hip swing action). In this case, in the first hip swing action, the center-of-gravity position moves to the right region (region 132), and then moves to near the origin O. Furthermore, in the second hip swing action as well, the center-of-gravity position moves to the right region, and then moves to near the origin O. That is, when the player swings his/her hip in the same direction for a second consecutive time, the center-of-gravity position passes a position near the origin O during a period from the first hip swing action to the second hip swing action. Accordingly, by clearing the immediately preceding swing direction data, it can be determined, at step S34, that the player consciously swings his/her hip in the same direction in succession.

Specifically, at step S36, the CPU 40 stores, in the main memory, a value (e.g., 0) indicating a direction different from any of the aforesaid four directions, as the immediately preceding swing direction data 512. Subsequently, the CPU 40 executes the process at step S37.

At step S37, the CPU 40 determines that the hip is not swung based on the center-of-gravity position. Specifically, the CPU 40 stores, in the main memory, data indicating that it is determined that the hip is not swung based on the center-of-gravity position. After step S37, the CPU 40 terminates the hip swing determination process based on the center-of-gravity position.

As described above, at step S33, whether or not the value representing the center-of-gravity position equal to or greater than the threshold value is determined, and, only when the result of the determination is affirmative, it is determined that the hip is swung based on the center-of-gravity position. That is, only when the center-of-gravity position exists in the aforesaid valid region (the front valid region, the rear valid region, the right valid region, and the left valid region), it is determined that the hip is swung based on the center-of-gravity position. On the other hand, when the center-of-gravity position exists in the aforesaid invalid region (the rectangular region centered at the origin O), it is determined that the hip is not swung based on the center-of-gravity position.

In this manner, by providing the invalid region, a hip swing action consciously made by the player can be determined with an increased accuracy. That is, when the player consciously swings his/her hip, the center-of-gravity position largely changes, but even when the player stands still without consciously swinging his/her hip, the center-of-gravity position constantly changes near the origin O. Since the invalid region has a rectangular shape centered at the origin O as described above, when the center-of-gravity position exists near the origin O, it is not determined that the hip is swung. Therefore, by setting the threshold value for the value representing the center-of-gravity position, a hip swing action consciously made by the player can be determined with an increased accuracy.

Moreover, since the threshold value for the center-of-gravity position at step S33 is greater than the threshold value at step S14, whether or not the player swings his/her hip can be determined with an increased accuracy. That is, in the first hip swing determination, whether or not a change of the load value is equal to or greater than the threshold value is determined (step S22), while in the second hip swing determination, the determination is performed based only on the center-of-gravity position. Accordingly, if the same threshold value is adopted at steps S33 and S14, and then the hip swing determination is performed based only on the center-of-gravity position, it may be determined that the hip is swung even though the player does not consciously swing his/her hip. Therefore, in the hip swing determination (second hip swing determination) based on the center-of-gravity position, a greater threshold value is adopted, and thereby a hip swing action consciously made by the player is determined.

Returning to FIG. 13, after the hip swing determination process based on the center-of-gravity position at step S5, the CPU 40 then executes the process at step S6.

At step S6, the CPU 40 determines whether or not it is determined that the hip is swung based on the center-of-gravity position at step S5. Specifically, the CPU 40 refers to the main memory, and determines whether or not the data indicating that it is determined that the hip is swung based on the center-of-gravity position is stored. When a result of the determination is negative, the CPU 40 then executes the process at step S7. When the result of the determination is affirmative, the CPU 40 then executes the process at step S8.

At step S7, the CPU 40 determines whether or not both the center-of-gravity movement flag and the load increase flag are ON. That is, even when it is determined that the hip is not swung based on the center-of-gravity position at step S5, whether or not the hip is swung is determined at step S7, based on the movement of the center of gravity and the change of the load which have been determined at steps S3 and 34. Specifically, the CPU 40 refers to the center-of-gravity movement flag data 508 and the load increase flag data 510 in the main memory, and determines whether or not both of these flags are ON. When a result of the determination is affirmative, the CPU 40 then executes the process at step S8. When the result of the determination is negative, the CPU 40 then executes the process at step S9.

At step S8, the CPU 40 sets the hip swing determination flag to ON. Specifically, the CPU 40 sets the hip swing determination flag, which is stored in the main memory, to ON, and stores the flag in the main memory again. Then, the CPU 40 executes the process at step S9.

At step S9, the CPU 40 executes the other game processes. At step S9, a process in accordance with the result of the hip swing determination at steps S2 to S8 is executed. For example, when the hip swing determination flag stored in the main memory is ON (when the hip swing determination flag is set to ON at step S8, or when Yes at step S1), the CPU 40 executes the process subsequent to the hip swing determination. Specifically, as the process subsequent to the hip swing determination, the CPU 40 causes an appearance in which the player character 120 swings its hip in the swing direction indicated by the swing direction data 506 to be displayed on the screen, or causes an indication that any of the selection objects 121 to 123 is selected to be displayed. In addition, as the process subsequent to the hip swing determination, the CPU 40 determines whether or not the answer given by the player is correct, and displays a content in accordance with a result of the determination or calculates a score. Moreover, when the process subsequent to the hip swing determination is terminated, the CPU 40 sets the hip swing determination flag stored in the main memory to OFF, and stores the flag in the main memory again. Furthermore, when the process subsequent to the hip swing determination is terminated, the CPU 40 stores the swing direction stored in the swing direction data 506, as the immediately preceding swing direction data 512, and clears (initializes) respective data (the load value data 502, the center-of-gravity position data 504, and the swing direction data 506). On the other hand, when the hip swing determination flag is OFF, the CPU 40 displays, on the screen, an appearance in which the player character 120 stands still or is slightly moving in the up-and-down direction, the selection objects 121 to 123, a background image, and the like, as shown in FIG. 7A. Subsequently, the CPU 40 executes the process at step S10.

At step S10, the CPU 40 determines whether or not the game ends. When a result of the determination is affirmative, the CPU 40 terminates the game process, and when the result of the determination is negative, the CPU 40 returns to step S1 and repeats the game process. For example, when the player presses the button (input means 26) of the controller 22 indicating a termination of the game process, the CPU 40 terminates the game process. Thus, the game process according to the present embodiment is terminated.

The threshold values and conditions adopted in the above-described process, the sequence of the processes, or the like, are merely illustrative. Thus, the aforesaid threshold values and conditions may be appropriately adjusted, and the sequence of the above-described processes may be any sequence. For example, the sequence of steps S6 and S7 may be interchanged. That is, the determination at step S7 may be performed after step S5, and when a result of the determination is negative, the determination at step S6 may be performed. As a result, when the amount of increase of the load is equal to or greater than the threshold value and in addition there is a movement of the center of gravity, it is determined that the hip is swung in the direction in which the center of gravity moves, while when the amount of increase of the load is less than the threshold value, the hip swing determination based on the center-of-gravity position is performed. That is, when the result of the above-described first hip swing determination is affirmative (when it is determined that the hip is swung in the first hip swing determination), it may be determined that the player swings his/her hip, and when the result of the first hip swing determination is negative, the second hip swing determination may be performed.

As described above, in the present embodiment, when a change of the load value per predetermined time period is equal to or greater than the threshold value (Yes in step S22), the hip swing action performed by the player can be determined based on the direction (the direction calculated at step S12) in which the center-of-gravity position moves at that time. In addition, even when the change of the load value is less than the threshold value, the hip swing action performed by the player can be determined based on the center-of-gravity position (steps S31 and S33). That is, when the change of the load value per predetermined time period is equal to or greater than the threshold value, it can be determined that the player quickly swings his/her hip in the predetermined direction. When the player slowly swings his/her hip in the predetermined direction, a change of the load value per predetermined time period is less than the threshold value. However, even in such a case, it can be determined that the player swings his/her hip, based on the center-of-gravity position.

In the present embodiment, when the amount of change of the load value per predetermined time period is equal to or greater than the threshold value, it is determined that the player swings his/her hip. In another embodiment, when a load value detected by the load controller 36 is equal to or greater than the threshold value, it may be determined that the player swings his/her hip. For example, as shown in FIG. 9B, in the above-described preliminary action of the hip swing action performed by the player, the increase of the load value is relatively small, but in the actual hip swing action (from W12 to W20), the increase of the load value is relatively large. Accordingly, for example, when the weight ratio exceeds 1.2, it may be determined that the player swings his/her hip.

In the present embodiment, the direction in which the player swings his/her hip is determined based on the direction in which the center-of-gravity position moves, the center-of-gravity position, and a speed at which the center-of-gravity position moves, which are obtained when the amount of change of the load value per predetermined time period is equal to or greater than the threshold value. That is, even when the amount of change of the load value is equal to or greater than the threshold value, if the value representing the center-of-gravity position is not equal to or greater than the threshold value or if the speed at which the center of gravity moves is not equal to or higher than the predetermined value, it is not determined that the player swings his/her hip. In another embodiment, whether or not the player swings his/her hip in a predetermined direction may be determined based only on the direction in which the center-of-gravity position moves, which is obtained when the amount of change of the load value per predetermined time period is equal to or greater than the threshold value.

Although in the present embodiment four directions are set as the direction in which the player swings his/her hip, in another embodiment the hip swing determination may be performed with respect to an arbitrary direction.

In the present embodiment, when the speed at which the center of gravity moves is equal to or higher than the predetermined value, it is determined that the player swings his/her hip. In another embodiment, when the speed at which the center of gravity moves is equal to or lower than a predetermined value, it may be determined that the player performs a predetermined action. In addition, when the amount of change of the speed at which the center of gravity moves is equal to or greater (or smaller) than a predetermined threshold value, it may be determined that the player performs a predetermined action. That is, in another embodiment, whether or not the speed at which the center of gravity moves satisfies a predetermined condition may be determined, and when a result of the determination is affirmative, it may be determined that the player performs a predetermined action.

In the present embodiment, when the absolute value of the coordinate value of the center of gravity is equal to or greater than the predetermined threshold value, it is determined that the player performs a predetermined action. In another embodiment, when the absolute value of the coordinate value of the center of gravity is less than a predetermined threshold value, it may be determined that the player performs a predetermined action.

In the present embodiment, a hip swing performed by the player is determined based on a rate of increase of the load value (the amount of increase of the load value per predetermined time period). In another embodiment, an action performed by the player may be determined based on a rate of decrease of the load value. For example, in a case where the player performs an action of jumping on the load controller 36; if the player performs an action of kicking the load controller 36 as a preliminary action for jumping, the load value detected by the load controller 36 increases. Then, when the player actually jumps, the load value decreases. In this case, when the rate of decrease of the load value per predetermined time period satisfies a predetermined condition (when the absolute value of the rate of decrease of the load value is equal to or greater than a predetermined value), it may be determined that the player jumps. Furthermore, based on the center-of-gravity position or the direction in which the center-of-gravity position moves at that time, the direction in which the player jumps may be determined. For example, when the center-of-gravity position obtained when the rate of decrease of the load value satisfies the predetermined condition is located near the origin O, it may be determined that the player jumps straight up. Also, for example, when the center-of-gravity position obtained when the rate of decrease of the load value satisfies the predetermined condition is located to the right of the origin O, it may be determined that the player jumps to the right.

For example, when the player makes a turn in skiing on the load controller 36, an action of the turn can be determined by using the above-described method. For example, when a quick turn is made in skiing, a skier moves the weight in accordance with a direction of the turn. When this action is performed on the load controller 36, the center-of-gravity position detected by the load controller 36 moves. In this case, similarly to in the above-described hip swing action, the load value detected by the load controller 36 increases or decreases. Accordingly, when the rate of increase of the load value, the rate of decrease of the load value, or the like, becomes equal to or higher than a predetermined threshold value, it may be determined that the player makes a turn. Further, based on the center-of-gravity position or the direction in which the center-of-gravity position moves which are obtained at that time, in which direction the player makes the turn can be determined. That is, by analyzing a change of the load value and a change of the center-of-gravity position which are obtained when the player makes a turn in skiing, whether or not the player makes a turn can be determined.

In another embodiment, a pattern of a change of the load value, which is obtained when the player performs a predetermined action, may be analyzed, and whether or not the pattern of the change of the detected load value is coincident with or similar to a predetermined pattern may be determined. Also, whether or not a local maximum value or a local minimum value of a change of the load within a predetermined time period, or a pattern based on a combination of the local maximum and minimum values satisfies a predetermined condition, may be determined. Then, based on the center-of-gravity position, the direction in which the center-of-gravity position moves, or the like, which are obtained when a result of the determination is affirmative, whether or not the player performs a predetermined action may be determined. For example, in the above-described hip swing action, after the hip swing action is started, the load value exhibits the local maximum value (W7) which is relatively small, then exhibits the local minimum value (W12), and then increases again, as shown in FIG. 9B. By detecting such a pattern of the change of the load value, an action performed by the player can be determined. In addition, for example, in a case of a jumping action, it is assumed that the load value exhibits quite a great local maximum value, then drastically decreases, and then drastically increases again. If such a pattern is detected, it is inferred that the player is performing the jumping action. By detecting, at this time, the center-of-gravity position or the direction in which the center-of-gravity position moves, in which direction the player is jumping can be determined.

In another embodiment, not only the hip swing action performed by the player, but also various actions may be determined. As described above, the jumping action (including an action of the player acting as if the player is jumping while keeping his/her feet on the platform 36a), and an action of quickly moving the center of gravity similarly to a turn in skiing, may be determined. Moreover, for example, an action of the player shaking his/her head, an action of the player swinging his/her arm, an action of the player alternately bending and stretching his/her legs as if the player is riding a bicycle, and the like, may be determined. That is, various actions in which the load and the center-of-gravity position change due to a relatively quick action of the player, may be determined. The threshold values and the conditions adopted in the above-described process may be changed in accordance with an action to be determined. For example, it is assumed that, if the player quickly swings his/her head and upper body similarly to a heading in soccer, the load value changes in the above-described manner. In addition, also if the player quickly swings his/her arm, the load value changes. In such a case, the center-of-gravity position changes in accordance with a change of the load value. Therefore, by previously setting a determination condition in accordance with an action to be determined, a predetermined action of the player can be determined.

In another embodiment, the present invention is also applicable to a game in which the player moves a character displayed on the screen based on the center-of-gravity position. That is, when the player quickly moves the weight, the unconscious preliminary action is detected as described above, and therefore the character cannot be moved in the direction intended by the player. However, by detecting a change of the load value in the above-described manner, an erroneous detection due to the preliminary action can be prevented.

As described above, whether or not the local maximum or minimum value of the load value, or the rate of increase or decrease of the load value is equal to or greater (or smaller)

than the predetermined threshold value, whether or not the load value is equal to or greater (or smaller) than the predetermined threshold value, whether or not the pattern of the change of the load value is coincident with or similar to the predetermined pattern, and the like, may be determined. That is, whether or not the load information concerning a load value detected by the load controller 36 or a change of the load value over time (the load information may be a load value, a rate of change of the load value, or a pattern of change of the load value) satisfies a predetermined condition, may be determined. Then, based on center-of-gravity information (the direction in which the center-of-gravity position changes, and the center-of-gravity position) obtained when a result of the determination thereof is affirmative, an action of the player may be determined.

In the present embodiment, the above-described process is performed by using the load controller 36 having the four load sensors 364. In another embodiment, the number of the load sensors is not necessarily four, but may be three, or five or more. In addition, it is not necessary that the four load sensors 364 are provided at four corners of the load controller 36, but the four load sensors 364 may be arranged in any manner. That is, the number and the arrangement of the load sensors may be arbitrary, and the center-of-gravity position can be calculated by performing a correction unique to a geometric arrangement of the load sensors.

In the present embodiment, data indicating the values detected by the respective load sensors 364 is transmitted to the game apparatus 12. In another embodiment, the load controller 36 may calculate the total value of the loads detected by the respective load sensors 364 and the center-of-gravity position, and may transmit the calculated total value and the calculated center-of-gravity position, to the game apparatus 12. That is, the game apparatus 12 may receive a signal including the total load value and the center-of-gravity position which are calculated by the load controller 36, and acquire these information from the received signal.

The game program of the present invention may be provided to the game apparatus 12, not only through an external storage medium such as the optical disc 18 but also through a wired or wireless communication line. The above-described program may be executed by a hand-held game apparatus. The game program may be preliminarily stored in a nonvolatile storage device embedded in the game apparatus 12. It is noted that an information storage medium having the game program stored therein may be a nonvolatile semiconductor memory in addition to an optical disc-shaped storage medium such as CD-ROM, DVD, and the like.

In another embodiment, the program for determining the above-described actions may be executed by an information processing apparatus other than the game apparatus, for example, by a special device for determining a predetermined action, a personal computer including an input device capable of measuring a load, and the like.

In the present embodiment, the process in the flow charts described above is performed by the CPU 40 of the game apparatus 12 executing the game program. In another embodiment, a part or the whole of the above-described process may be performed by a special circuit provided in the game apparatus 12.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program executable by a computer of an information processing apparatus for processing a signal supplied from an input device which includes a load sensor for detecting a load of a user, the information processing program causing the computer to provide execution comprising:
    acquiring load information concerning the load of the user or a change of the load over time, based on the signal supplied from the input device;
    acquiring center-of-gravity information concerning a center-of-gravity position of the user or a direction in which the center-of-gravity position moves, based on the signal supplied from the input device;
    determining whether or not the change of the load over time satisfies a first condition;
    specifying a time when the change of the load over time satisfies the first condition;
    specifying a coordinate value of the center-of-gravity position at the specified time; and
    determining a predetermined action of the user, using the specified coordinate value of the center-of-gravity position obtained when the change of the load over time satisfies the first condition,
    the center-of-gravity information concerning the direction in which the center-of-gravity position moves is acquired based on the signal supplied from the input device, and
    the predetermined action of the user is determined based on the center-of-gravity information concerning the direction in which the center-of-gravity position moves, which is acquired and obtained when the result of the determination of whether or not the change of the load over time satisfies the first condition is affirmative.

2. The non-transitory computer-readable storage medium according to claim 1, wherein whether or not the load of the user increases is determined based on the load information.

3. The non-transitory computer-readable storage medium according to claim 2, wherein whether or not a rate of increase of the load is equal to or higher than a predetermined threshold value is determined.

4. The non-transitory computer-readable storage medium according to claim 1, wherein
    the center-of-gravity information concerning the center-of-gravity position is acquired based on the signal supplied from the input device, and
    even when the change of the load over time does not satisfy the first condition, if the absolute value of a coordinate value, with respect to a direction of a predetermined axis, of the center-of-gravity position which is obtained when the change of the load over time does not satisfy the first condition, is equal to or greater than a predetermined threshold value, the user is determined as performing the predetermined action.

5. The non-transitory computer-readable storage medium according to claim 1, wherein the information processing program causes the computer to provide further execution comprising:
    acquiring the center-of-gravity information concerning the center-of-gravity position and the direction in which the center-of-gravity position moves, based on the signal supplied from the input device,
    determining whether or not the absolute value of a coordinate value of the center-of-gravity position with respect to a direction of a first axis is equal to or greater than a first threshold value, and determining the predetermined action of the user, based on the direction in which the center-of-gravity position moves, which is obtained when the result of the determination of whether or not the change of the load over time satisfies the first condition is affirmative and a result of the determination of whether or not the absolute value of the coordinate value of the center-of-gravity position with respect to the direction of the first axis is equal to or greater than the first threshold value is affirmative.

6. The non-transitory computer-readable storage medium according to claim 5, wherein the information processing program causes the computer to provide further execution comprising:
determining whether or not the absolute value of the coordinate value of the center-of-gravity position with respect to the direction of the first axis is equal to or greater than a second threshold value which is greater than the first threshold value, and
even when the result of the determination as to whether the change of the load over time satisfies the first condition is negative, determining the predetermined action of the user, based on the center-of-gravity position obtained when the result of the determination is negative and a result of the determination of whether or not the absolute value of the coordinate value of the center-of-gravity position with respect to the direction of the first axis is equal to or greater than the second threshold value is affirmative.

7. The non-transitory computer-readable storage medium according to claim 1, wherein
the center-of-gravity information concerning the center-of-gravity position is acquired based on the signal supplied from the input device,
whether or not the center-of-gravity position exists in a predetermined region which is set at a predetermined position on an input plane which is provided in the input device and to which the load is applied by the user is determined, and
when the result of the determination of whether or not the change of the load over time satisfies the first condition is affirmative and a result of the determination, at that time, of whether or not the center-of-gravity position exists in the predetermined region is negative, the user is determined as performing the predetermined action.

8. The non-transitory computer-readable storage medium according to claim 1, wherein
the center-of-gravity information concerning the center-of-gravity position and the direction in which the center-of-gravity position moves is acquired based on the signal supplied from the input device,
whether or not the absolute value of a coordinate value of the center-of-gravity position with respect to a direction of a first axis is equal to or greater than a predetermined threshold value is determined, and
when a result of the determination of whether or not the absolute value of the coordinate value of the center-of-gravity position with respect to the direction of the first axis is equal to or greater than the predetermined threshold value is affirmative, the predetermined action of the user based on the center-of-gravity position, which is obtained when the result is affirmative, is determined, and
the predetermined action of the user based on the direction in which the center-of-gravity position moves, which is obtained when the result of the determination of whether or not the absolute value of the coordinate value of the center-of-gravity position with respect to the direction of the first axis is equal to or greater than the predetermined threshold value is negative and the result of the determination of whether or not the change of the load over time satisfies the first condition is affirmative is determined.

9. The non-transitory computer-readable storage medium according to claim 1, wherein the information processing program causes the computer to provide further execution comprising:
calculating a speed at which the center-of-gravity position of the user moves, based on the acquired center-of-gravity information; and
determining whether or not the speed at which the center-of-gravity position moves satisfies a second condition, and
when the result of the determination of whether or not the change of the load over time satisfies the first condition is affirmative and a result of the determination, at that time, of whether or not the speed at which the center-of-gravity position moves satisfies the second condition is affirmative, the predetermined action of the user is determined based on the center-of-gravity information.

10. The non-transitory computer-readable storage medium according to claim 1, wherein
a plurality of first regions and a plurality of second regions provided at boundaries of the first regions are in advance set on an input plane which is provided in the input device and to which the load is applied by the user, and
when the center-of-gravity position, which is acquired and obtained when the result of the determination of whether or not the change of the load over time satisfies the first condition is negative, exists in the first region, the user is determined as performing the predetermined action.

11. The non-transitory computer-readable storage medium according to claim 1, wherein whether or not the user performs the predetermined action in a predetermined direction is determined.

12. The non-transitory computer-readable storage medium according to claim 1, wherein
whether or not the user performs the predetermined action in a predetermined direction is repeatedly determined,
when the user performs the predetermined action in the predetermined direction, a determination result indicating the direction in which the user performs the predetermined action is stored in a memory, and
the user is determined as performing the predetermined action, only when the direction in which the user performs the predetermined action, which is obtained based on the center-of-gravity information, is different from the direction indicated by an immediately preceding determination result stored in the memory.

13. The non-transitory computer-readable storage medium according to claim 12, wherein
a plurality of regions each indicating a direction in which the user performs the action is in advance set on an input plane which is provided in the input device and to which the load is applied by the user, and the user is determined as performing the predetermined action in the direction indicated by the region, on the input plane, where the center-of-gravity position exists.

14. The non-transitory computer-readable storage medium according to claim 13, wherein even when the result of the determination as to whether the change of the load over time satisfies the first condition is negative, the user is determined as performing the predetermined action in the direction indicated by the region, on the input plane, where the center-of-gravity position exists, the center-of-gravity position being obtained when the result of the determination is negative.

15. The non-transitory computer-readable storage medium according to claim 1, wherein the information processing program causes the computer to provide further execution comprising displaying, on a display device, an appearance in which the user performs the predetermined action, when a result of the determination of the predetermined action of the user, based on the center-of-gravity information obtained when the result of the determination of whether or not the change of the load over time satisfies the first condition is affirmative.

16. The non-transitory computer-readable storage medium according to claim 1, wherein the first condition is satisfied when a pattern of local maximum and minimum values of the load information over a predetermined period of time satisfies a threshold value.

17. An information processing apparatus having one or more processors and configured to process a signal supplied from an input device which includes a load sensor for detecting a load of a user, the information processing apparatus comprising:
a load information acquisition unit for acquiring load information concerning the load of the user or a change of the load over time, based on the signal supplied from the input device;
a center-of-gravity information acquisition unit for acquiring center-of-gravity information concerning a center-of-gravity position of the user or a direction in which the center-of-gravity position moves, based on the signal supplied from the input device;
a load determination unit for determining whether or not the change of the load over time satisfies a first condition;
a time specifying unit for specifying a time when the change of the load over time satisfies the first condition;
a coordinate value specifying unit for specifying a coordinate value of the center-of-gravity position at the specified time; and
an action determination unit for determining a predetermined action of the user, using the specified coordinate value of the center-of-gravity position obtained when the change of the load over time satisfies the first condition,
the center-of-gravity information concerning the direction in which the center-of-gravity position moves is acquired based on the signal supplied from the input device, and
the predetermined action of the user is determined based on the center-of-gravity information concerning the direction in which the center-of-gravity position moves, which is acquired and obtained when the result of the determination of whether or not the change of the load over time satisfies the first condition is affirmative.

18. An information processing system, comprising:
an input device having a load sensor for detecting a load of a user; and
an information processing apparatus having one or more processors and coupled to the input device, the information processing apparatus configured to process a signal supplied from the input device and comprising:
a load information acquisition unit for acquiring load information concerning the load of the user or a change of the load over time, based on the signal supplied from the input device;
a center-of-gravity information acquisition unit for acquiring center-of-gravity information concerning a center-of-gravity position of the user or a direction in which the enter-of-gravity position moves, based on the signal supplied from the input device;
a load determination unit for determining whether or not the change of the load over time satisfies a first condition;
a time specifying unit for specifying a time when the change of the load over time satisfies the first condition;
a coordinate value specifying unit for specifying a coordinate value of the center-of-gravity position at the specified time; and
an action determination unit for determining a predetermined action of the user, using the specified coordinate value of the center-of-gravity position obtained when the change of the load over time satisfies the first condition,
the center-of-gravity information concerning the direction in which the center-of-gravity position moves is acquired based on the signal supplied from the input device, and
the predetermined action of the user is determined based on the center-of-gravity information concerning the direction in which the center-of-gravity position moves, which is acquired and obtained when the result of the determination of whether or not the change of the load over time satisfies the first condition is affirmative.

19. A method, implemented in an information processing apparatus having one or more processors, for processing a signal supplied from an input device which includes a load sensor for detecting a load of a user, the method comprising:
acquiring load information concerning the load of the user or a change of the load over time, based on the signal supplied from the input device;
acquiring center-of-gravity information concerning a center-of-gravity position of the user or a direction in which the center-of-gravity position moves, based on the signal supplied from the input device;
determining, using the one or more processors, whether or not the change of the load over time satisfies a first condition;
specifying a time when the change of the load over time satisfies the first condition;
specifying a coordinate value of the center-of-gravity position at the specified time; and
determining a predetermined action of the user, using the specified coordinate value of the center-of-gravity position obtained when the change of the load over time satisfies the first condition,
the center-of-gravity information concerning the direction in which the center-of-gravity position moves is acquired based on the signal supplied from the input device, and
the predetermined action of the user is determined based on the center-of-gravity information concerning the direction in which the center-of-gravity position moves, which is acquired and obtained when the result of the determination of whether or not the change of the load over time satisfies the first condition is affirmative.

20. A non-transitory computer-readable storage medium having stored therein an information processing program executable by a computer of an information processing apparatus for processing a signal supplied from an input device which includes a load sensor for detecting a load of a user, the information processing program causing the computer to provide execution comprising:
- acquiring load information concerning the load of the user or a change of the load over time, based on the signal supplied from the input device;
- acquiring center-of-gravity information concerning a center-of-gravity position of the user or a direction in which the center-of-gravity position moves, based on the signal supplied from the input device;
- determining whether or not the change of the load over time satisfies a first condition; and
- determining a predetermined action of the user, based on the direction in which the center-of-gravity position moves when the change of the load over time satisfies the first condition.

* * * * *